(12) United States Patent
Basch et al.

(10) Patent No.: US 12,380,345 B2
(45) Date of Patent: Aug. 5, 2025

(54) SYSTEMS AND METHODS FOR AUTOMATIC EVENT OUTCOME PREDICTION, CONFIRMATION, AND VALIDATION USING MACHINE LEARNING

(71) Applicant: Sofabet Co., Los Angeles, CA (US)

(72) Inventors: Aaron Basch, Los Angeles, CA (US); Evan Fisher, Venice, CA (US)

(73) Assignee: Sofabet Co., Los Angeles, CA (US)

( * ) Notice: Subject to any disclaimer, the term of this patent is extended or adjusted under 35 U.S.C. 154(b) by 912 days.

(21) Appl. No.: 17/543,650

(22) Filed: Dec. 6, 2021

(65) Prior Publication Data

US 2022/0188672 A1    Jun. 16, 2022

Related U.S. Application Data

(60) Provisional application No. 63/121,920, filed on Dec. 6, 2020.

(51) Int. Cl.
| | | |
|---|---|---|
| *G06N 5/04* | (2023.01) | |
| *G06N 5/022* | (2023.01) | |
| *G06Q 50/00* | (2012.01) | |
| *G06Q 50/34* | (2012.01) | |
| *G07F 17/32* | (2006.01) | |

(52) U.S. Cl.
CPC .............. *G06N 5/04* (2013.01); *G06N 5/022* (2013.01); *G06Q 50/01* (2013.01); *G06Q 50/34* (2013.01); *G07F 17/3241* (2013.01)

(58) Field of Classification Search
None
See application file for complete search history.

(56) References Cited

U.S. PATENT DOCUMENTS

| | | | |
|---|---|---|---|
| 10,726,359 B1 * | 7/2020 | Drouin | G16H 50/30 |
| 11,183,016 B2 * | 11/2021 | Merati | G07F 17/3227 |
| 11,386,357 B1 * | 7/2022 | Kapoor | G06N 20/00 |
| 11,645,889 B2 * | 5/2023 | Marantelli | G07F 17/3258 463/28 |
| 11,954,974 B2 * | 4/2024 | Marantelli | G06Q 30/06 |
| 12,051,306 B2 * | 7/2024 | Amaitis | G07F 17/3269 |
| 2005/0075164 A1 * | 4/2005 | Krynicky | G07F 17/32 463/25 |
| 2012/0295698 A1 * | 11/2012 | Demino | G07F 17/3288 463/28 |
| 2013/0029755 A1 * | 1/2013 | Villarreal | G07F 17/3288 463/25 |

(Continued)

*Primary Examiner* — Maikhanh Nguyen

(57) ABSTRACT

Systems and methods for event outcome validation are provided. The system receives a user input indicative of an event and at least one anticipated outcome of the event to be wagered on by the user. The system receives confirmation data associated with an outcome of the event from at least one confirmation data source confirming the outcome of the event and classifies the confirmation data utilizing at least one machine learning algorithm. The system determines a threshold of confirmation data sources to validate the outcome of the event and utilizes the at least one machine learning algorithm to determine a reduced threshold of confirmation data sources to validate the outcome of the event based on at least one of the classified confirmation data and a confirmation rating of the at least one confirmation data source. The system validates the outcome of the event based on the reduced threshold.

37 Claims, 25 Drawing Sheets

(56) References Cited

U.S. PATENT DOCUMENTS

| | | | |
|---|---|---|---|
| 2013/0053991 A1* | 2/2013 | Ferraro, III | G06Q 90/00 700/93 |
| 2016/0189483 A1* | 6/2016 | Ballman | G07F 17/3258 463/28 |
| 2019/0221080 A1* | 7/2019 | Reetz | G07F 17/3223 |
| 2022/0012837 A1* | 1/2022 | Reinhart | G06Q 40/04 |

* cited by examiner

200

| Maximum Sample Size Needed (user confirmations) for a given Population (users betting on the event) to have sufficient data to validate event outcome with no bias. | | | | | | | | | |
|---|---|---|---|---|---|---|---|---|---|
| Population Size (# of users betting on the same event) | 95.0% | Confidence Interval 1.960 | | 99.0% | Confidence Interval 2.576 | | 99.9% | Confidence Interval 3.291 | |
| Margin of Error: | 5.0% | 2.5% | 1.0% | 5.0% | 2.5% | 1.0% | 5.0% | 2.5% | 1.0% |
| 2 | 2 | 2 | 2 | 2 | 2 | 2 | 2 | 2 | 2 |
| 4 | 4 | 4 | 4 | 4 | 4 | 4 | 4 | 4 | 4 |
| 6 | 6 | 6 | 6 | 6 | 6 | 6 | 6 | 6 | 6 |
| 8 | 8 | 8 | 8 | 8 | 8 | 8 | 8 | 8 | 8 |
| 10 | 10 | 10 | 10 | 10 | 10 | 10 | 10 | 10 | 10 |
| 20 | 19 | 20 | 20 | 19 | 20 | 20 | 20 | 20 | 20 |
| 30 | 28 | 29 | 30 | 29 | 30 | 30 | 29 | 30 | 30 |
| 40 | 36 | 39 | 40 | 38 | 39 | 40 | 39 | 40 | 40 |
| 50 | 44 | 48 | 50 | 47 | 49 | 50 | 48 | 49 | 50 |
| 75 | 63 | 72 | 74 | 67 | 73 | 75 | 70 | 74 | 75 |
| 100 | 80 | 94 | 99 | 87 | 96 | 99 | 92 | 98 | 100 |
| 150 | 108 | 137 | 148 | 122 | 142 | 149 | 132 | 145 | 149 |
| 200 | 132 | 177 | 196 | 154 | 185 | 198 | 169 | 191 | 199 |
| 250 | 152 | 215 | 244 | 182 | 229 | 246 | 203 | 236 | 248 |
| 300 | 169 | 251 | 291 | 207 | 270 | 295 | 235 | 281 | 297 |
| 400 | 196 | 318 | 384 | 250 | 348 | 391 | 292 | 366 | 394 |
| 500 | 217 | 377 | 475 | 285 | 421 | 485 | 342 | 448 | 491 |
| 600 | 234 | 432 | 565 | 315 | 490 | 579 | 386 | 527 | 587 |
| 700 | 248 | 481 | 653 | 341 | 554 | 672 | 425 | 603 | 682 |
| 800 | 260 | 526 | 739 | 363 | 615 | 763 | 460 | 675 | 777 |
| 1,000 | 278 | 606 | 906 | 399 | 727 | 943 | 520 | 813 | 964 |
| 1,200 | 291 | 674 | 1,067 | 428 | 827 | 1,119 | 570 | 940 | 1,149 |
| 1,500 | 306 | 759 | 1,297 | 460 | 959 | 1,376 | 629 | 1,114 | 1,421 |
| 2,000 | 322 | 869 | 1,655 | 498 | 1,141 | 1,785 | 703 | 1,369 | 1,862 |
| 2,500 | 333 | 952 | 1,984 | 525 | 1,288 | 2,173 | 756 | 1,585 | 2,289 |
| 3,500 | 346 | 1,068 | 2,565 | 558 | 1,510 | 2,890 | 827 | 1,936 | 3,099 |
| 5,000 | 357 | 1,176 | 3,288 | 586 | 1,734 | 3,842 | 890 | 2,321 | 4,221 |
| 7,500 | 365 | 1,275 | 4,212 | 610 | 1,961 | 5,165 | 947 | 2,748 | 5,873 |
| 10,000 | 370 | 1,332 | 4,899 | 622 | 2,098 | 6,239 | 977 | 3,023 | 7,303 |
| 25,000 | 378 | 1,448 | 6,939 | 646 | 2,400 | 9,972 | 1,038 | 3,693 | 12,999 |
| 50,000 | 381 | 1,491 | 8,057 | 655 | 2,521 | 12,457 | 1,060 | 3,987 | 17,565 |
| 75,000 | 382 | 1,506 | 8,514 | 658 | 2,564 | 13,585 | 1,068 | 4,096 | 19,895 |
| 100,000 | 383 | 1,513 | 8,763 | 659 | 2,586 | 14,229 | 1,071 | 4,152 | 21,308 |
| 250,000 | 384 | 1,527 | 9,249 | 662 | 2,626 | 15,557 | 1,078 | 4,258 | 24,431 |
| 500,000 | 384 | 1,532 | 9,423 | 663 | 2,640 | 16,057 | 1,081 | 4,295 | 25,686 |
| 1,000,000 | 384 | 1,534 | 9,513 | 663 | 2,647 | 16,319 | 1,082 | 4,314 | 26,363 |
| 2,500,000 | 384 | 1,536 | 9,567 | 663 | 2,651 | 16,480 | 1,083 | 4,325 | 26,787 |
| 10,000,000 | 384 | 1,536 | 9,595 | 664 | 2,654 | 16,562 | 1,083 | 4,330 | 27,004 |
| 100,000,000 | 384 | 1,537 | 9,603 | 664 | 2,654 | 16,587 | 1,083 | 4,332 | 27,069 |
| 300,000,000 | 384 | 1,537 | 9,604 | 664 | 2,654 | 16,589 | 1,083 | 4,332 | 27,074 |

FIG. 7C

SYSTEMS AND METHODS FOR AUTOMATIC EVENT OUTCOME PREDICTION, CONFIRMATION, AND VALIDATION USING MACHINE LEARNING

RELATED APPLICATIONS

The present application claims the benefit of U.S. Provisional Application Ser. No. 63/121,920 filed on Dec. 6, 2020, the entire disclosure of which is expressly incorporated herein by reference.

BACKGROUND

Technical Field

The present disclosure relates generally to the field of event validation. More specifically, the present disclosure relates to systems and methods for automatic event outcome prediction, confirmation, and validation using unique data sources and machine learning.

Related Art

Conventional and well-known events associated with a wagering system rely on several data sources that aid with predicting, confirming, and validating outcomes of these conventional and well-known events with a high level of confidence. For example, events such as the Super Bowl, the World Cup, and the Olympics are associated with one or more data sources (e.g., a broadcaster and a broadcasting network) that predict an outcome of the respective event, and confirm and validate an outcome of the respective event upon its conclusion. However, an inability to predict an outcome of a conventional and well-known event can yield an inefficient market (e.g., a wagering system operator can have imbalanced exposure on one side of a wager).

Further, as a scale of an event (e.g., marketing, popularity, size, accessibility, etc.) diminishes, so does a confidence level of a data source utilized to predict and confirm an outcome of the event. These non-conventional and/or lesser-known events can include, but are not limited to, online gaming (e.g., electronic sports or esports), less prominent sporting events (e.g., the Lumberjack World Championship and the World Bog Snorkeling Championship), endurance races (e.g., the Andes Race Chaski Challenge), and local and traditional competitions (e.g., Cooper's Hill Cheese-Rolling and Wake and Steinstossen). While non-conventional and/or lesser-known events generally have sufficient record keeping and/or viewer base, it can be challenging to source or access this information. This can be problematic if multiple parties attempt to confirm an outcome of a non-conventional and/or lesser-known event associated with a wager. For example, if a few individuals participate in a wager associated with a non-conventional and/or lesser-known event, an individual could attempt to manipulate a known outcome of the event in his or her favor to win or dispute the wager. The lack of information associated with non-conventional and/or lesser-known events can also result in cost prohibitive and/or unreliable data sources and/or methods to predict and confirm outcomes of such events.

Additionally, while several applications (e.g., global equity, commodity, and debt) benefit from efficient markets, applications (e.g., wagering) that are time-bound and have mutually exclusive and collectively exhaustive outcomes suffer from limited maturity in markets and a lack of mechanisms to facilitate efficiency in those markets. For example, wagering operators (e.g., a casino or a sportsbook) generally employ individuals to determine and set odds on each event that is offered for wager and to adjust those odds based on activity in the market. However, these processes are largely manual and therefore can result in an imbalanced market, overhead costs and/or significant financial losses.

Further, municipal, state and federal regulatory compliance precludes wagering operators from offering an event for wager for which they do not have a verifiable data source to determine an outcome of the event. Accordingly, a significant number of non-conventional and/or lesser-known events that often have dedicated viewership are unavailable for wagering by individuals, including but not limited to, growing audiences in esports on platforms such as Twitch. These individuals are also disadvantaged by a lack of market mechanisms to hedge existing wagers or proactively identify arbitrage opportunities based on available data provided by the wagering operators to drive the market towards efficiency.

Therefore, there is a need for systems and methods which can generate an event and associated wager; leverage unique data sources, applied statistical techniques, and machine learning to automatically predict an anticipated outcome of the event and confirm and validate the outcome of the event with a given level of confidence and margin of error (e.g., 99.9% confidence and 1.0% margin of error) that is compliant with municipal, state and federal regulations; and provide mechanisms to improve market efficiency and drive market participants to more logical outcomes. These and other needs are addressed by the systems and methods of the present disclosure.

SUMMARY

The present disclosure relates to systems and methods for automatic event outcome prediction, confirmation, and validation using unique data sources and machine learning.

In an embodiment of the present disclosure, the system can receive a user input indicative of an event and at least one anticipated outcome of the event to be wagered on by the user. The system can receive prediction data associated with the anticipated outcome of the event from at least one prediction data source. A prediction data source can include respective users of the system (e.g., the Social Betwork™) and/or external data source(s). The users and/or the external data source(s) can input respective predictions with or without participating in a wager related to the event and the anticipated outcome of the event. The system classifies the prediction data utilizing a machine learning algorithm in association with the anticipated outcome of the event to determine an accuracy of the prediction data. Additionally, the system can determine a prediction rating of a prediction data source where the prediction rating is indicative of a historical accuracy of the prediction data received from the prediction data source.

The system can determine and display odds associated with the anticipated outcome of the event based on one or more of a received volume of wager data for the event, the classified prediction data and a prediction rating of a prediction data source. A user can communicate with and wager in any third-party wagering system coupled to the system via an application programming interface (API). The system can also identify arbitrage and other market recommendations to a buyer and seller based on the classified prediction and wager data.

The system can receive confirmation data associated with an outcome of the event from at least one confirmation data source confirming the outcome of the event. A confirmation data source can include respective users of the system (e.g., the Social Betwork™) and/or external data source(s). The users and/or the external data source(s) can input respective confirmations with or without participating in a wager related to the event and the outcome of the event. The system classifies the confirmation data utilizing the machine learning algorithm to determine an accuracy of the confirmation data. Additionally, the system can determine a confirmation rating of a confirmation data source where the confirmation rating is indicative of a historical accuracy of confirmation data received from the confirmation data source.

The system determines a threshold of confirmation data sources to validate the outcome of the event. In particular, the system determines a population size associated with the outcome of the event and determines the threshold of confirmation data sources to validate the outcome of the event based on the population size and a first set of variables. The system utilizes the machine learning algorithm to determine a reduced threshold of confirmation data sources to validate the outcome of the event by scaling for the population size and a second set of variables based on at least one of the classified confirmation data and a confirmation rating of a confirmation data source.

The system validates the outcome of the event when at least one of the classified confirmation data and the confirmation rating of a confirmation data source is greater than the reduced threshold. The system can adjust a prediction rating of a prediction data source based on the classified prediction data by determining whether the received prediction data is correct based on the validated outcome of the event and can adjust a confirmation rating of a confirmation data source based on the classified confirmation data by determining whether the received confirmation data is correct based on the validated outcome of the event. The system processes payment to the user based on the validated outcome of the event.

BRIEF DESCRIPTION OF THE DRAWINGS

The foregoing features of the invention will be apparent from the following Detailed Description of the Invention, taken in connection with the accompanying drawings, in which:

FIG. 7C is a diagram illustrating a requisite sample size of confirmation data sources weighted equally to validate an outcome of an event for respective confidence intervals and margins of error based on a population size of the event;

DETAILED DESCRIPTION

The present disclosure relates to systems and methods for automatic event outcome prediction, confirmation, and validation using unique data sources and machine learning as described in detail below in connection with FIGS. 1-20.

Figure 1A:
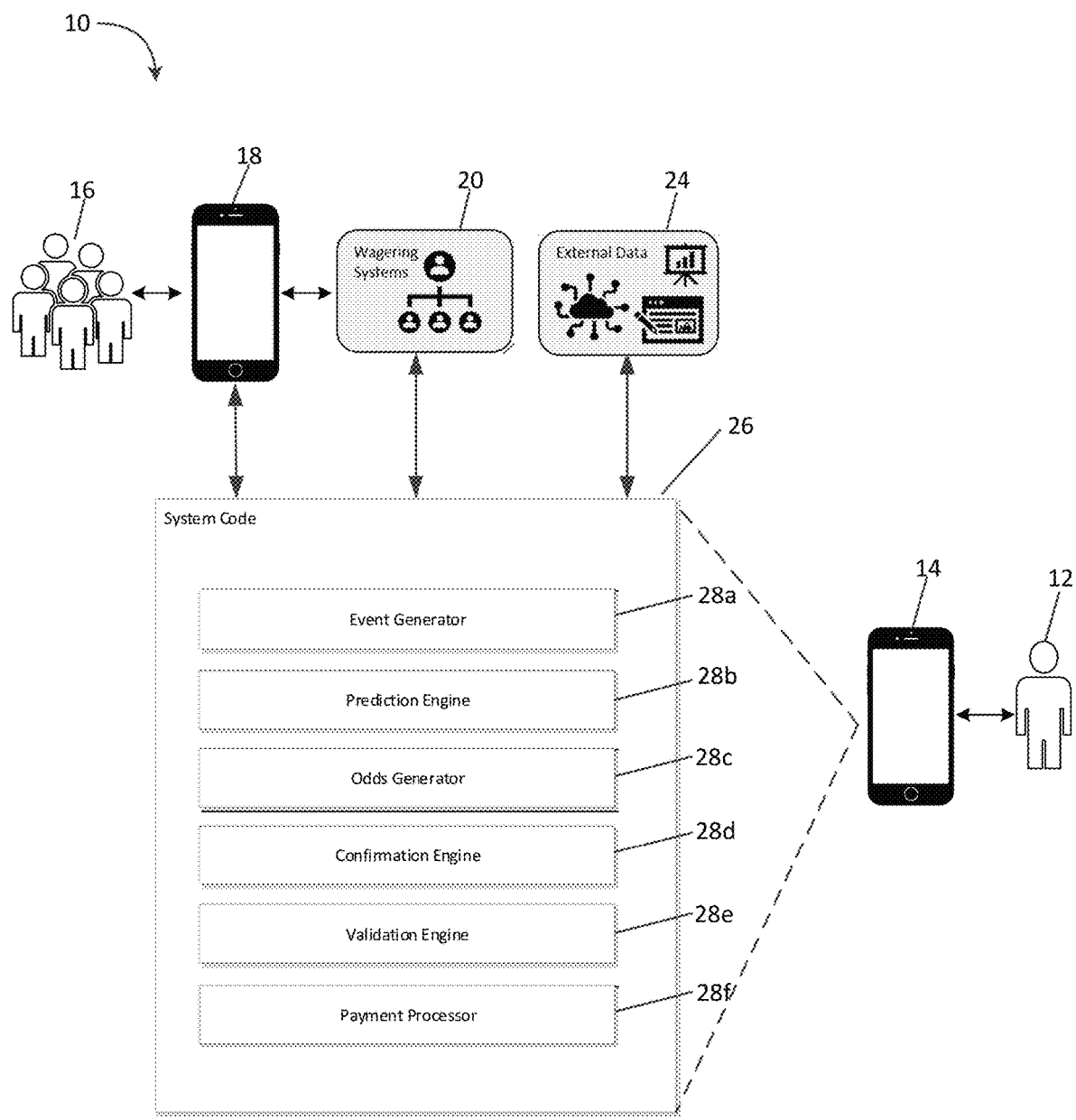
FIG. 1A is a diagram illustrating an embodiment of the system of the present disclosure.

Turning to the drawings, FIG. 1A is a diagram illustrating an embodiment of the system 10 of the present disclosure. The system 10 could be embodied as a central processing unit 14 (processor) of a first user 12 in communication with one or more central processing units 18 corresponding to a community of users 16, one or more wagering systems 20 and external data source(s) 24. The processors 14 and 18 could include, but are not limited to, a computer system, a server, a personal computer, a cloud computing device, a smart phone, a kiosk, a tablet or any other suitable device programmed to carry out the processes disclosed.

The user 12 and the community of users 16 are part of a user base or Social Betwork™ of the system 10. Users can generate an event and associated outcomes to wager against other users. Additionally, users and/or institutions that meet predetermined criteria (e.g., regulatory compliance, credit rating, "Trusted User" status in the system 10, etc.) can generate and associate wagering pools with an existing event offered by the system 10. The wagering system(s) 20 is in communication with the processors 14 and 18 via an application programming interface (not shown) and can include, but is not limited to, a peer-to-peer system, a pool, a conventional sportsbook, a market place, and an exchange based system. These wagering system(s) 20 can integrate social media sharing functionality to encourage users to share events and increase engagement on the system 10 (e.g., an application platform). The user 12 and the community of users 16 can communicate with and wager in the wagering system(s) 20 via the application programming interface. The system 10 can receive external data from external data source(s) 24 associated with a prediction and/or a confirmation of an outcome of an event wagered on. The external data can include, but is not limited to, the following external data source(s) 24: publicly shared social media data, external user data, mined data, manually sourced data by an administrator, official data associated with an event and released by an organizer of the event (e.g., a professional sports league), a broadcaster of an event (e.g., a sportscaster and/or cable network, a streaming application or a website), a sponsor of an event (e.g., a company or a non-profit), and a data vendor.

The system 10 includes system code 26 (i.e., non-transitory, computer-readable instructions) stored on a computer-readable medium and executable by the hardware processor 14 or one or more computer systems. The processor 14 executes system code 26, which generates an event and at least one associated outcome, receives and classifies event outcome prediction data, determines and displays odds and market inefficiencies, receives and classifies event outcome confirmation data, automatically validates an outcome of the event, adjusts a user and/or external data source rating with respect to received event outcome prediction and/or event outcome confirmation data, and processes a payment for the wager based on the validated event outcome. The code 26 could include various custom-written software modules that carry out the steps/processes discussed herein including, but not limited to, an event generator 28a, a prediction engine 28b, an odds generator 28c, a confirmation engine 28d, a validation engine 28e, and a payment processor 28f. It should be understood that any of the event generator 28a, prediction engine 28b, odds generator 28c, confirmation engine 28d, and validation engine 28e could be a machine learning system or utilize machine learning (e.g., an algorithm) and/or applied statistical techniques to execute the specific respective processes thereof. In particular and as described in further detail below, the custom-written software modules can utilize machine learning and/or applied statistical techniques to automatically weight and leverage unique data sources and/or data points to yield respective process outputs. A machine learning algorithm can be one or more of a simple linear regression, a linear regression, a logistic regression, a binary regression, a polynomial regression, a support vector regression, a decision tree regression, an ordinary least square regression, k-means, an ensemble method, an apiori algorithm, principal component analysis, a singular value decomposition, reinforcement or semi-supervised machine learning, independent component analysis, supervised learning, unsupervised learning, a naive bayes, a bayesian statistical technique, a random forest, a neural network, a support vector machine, and a natural language processing technique. Further, the custom-written software modules can utilize these respective process outputs as feedback inputs (e.g., backpropagation and/or feedback loops) to automatically improve and increase an efficiency of the respective processes thereof. In this way, the system 10 realizes a non-conventional application of unique data sources and/or data points to automatically improve processes executed by the processor 14 and increase the efficiency of each of the processes and the processor 14.

The code 26 could be programmed using any suitable programming languages including, but not limited to, C, C++, C#, Java, Python, Golang, JS React or any other suitable language. Additionally, the code 26 could be distributed across multiple computer systems in communication with each other over a communications network, stored within a kiosk or other hardware, and/or stored and executed on a cloud computing platform and remotely accessed by a computer system in communication with the cloud platform. The code 26 could communicate with the wagering system (s) 20 and the external data source(s) 24, which could be stored on the same computer system as the code 26, or on one or more other computer systems in communication with the code 26.

Still further, the system 10 could be embodied as a customized hardware component such as a field-programmable gate array ("FPGA"), application-specific integrated circuit ("ASIC"), embedded system, or other customized hardware components without departing from the spirit or scope of the present disclosure. It should be understood that FIG. 1A is only one potential configuration, and the system 10 of the present disclosure can be implemented using a number of different configurations.

Figure 1B:
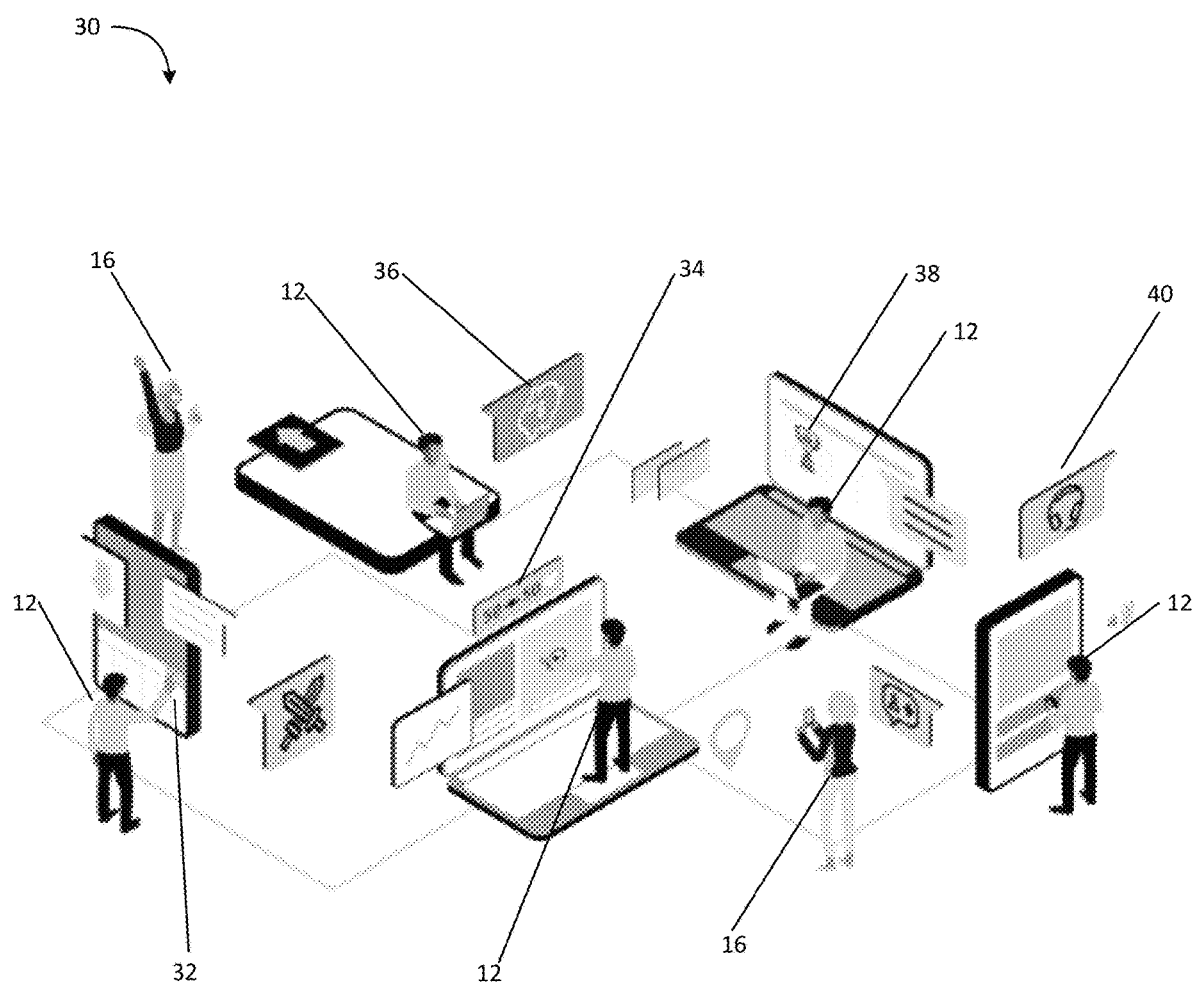
FIG. 1B is a flow diagram illustrating another embodiment of the system of the present disclosure.

FIG. 1B is a flow diagram 30 illustrating another embodiment of the system of the present disclosure. Beginning in step 32, the system 10 receives event data from a user 12. The system 10 can select an event offered by the system 10 or generate an event based on the received event data. In step 34, the system 10 receives prediction data indicative of a prediction of an outcome of the event. For example, prior to a commencement of an event, a user 12 can input a prediction indicative of an outcome the user 12 believes will occur.

The system 10 can receive a plurality of predictions from respective users 16 of the system 10 (e.g., the Social Betwork™) and/or external data source(s) 24. Then, in step 36, the system 10 receives wager input data indicative of an event and associated outcome(s) thereof from a user 12. The system 10 can determine and display odds and market opportunities with respect to at least one anticipated outcome associated with the event based on a volume of the wager input data and/or the prediction data.

In step 38, the system 10 receives and classifies event outcome confirmation data. For example, at a conclusion of an event, the system 10 can receive confirmation data indicative of an event outcome from a user 12. The system 10 can receive a plurality of confirmations from respective users 16 of the system 10 (e.g., the Social Betwork™) and/or external data source(s) 24. The system 10 validates an outcome of the event based on the received and classified confirmation data.

Lastly, in step 40, the system 10 provides a user 12 and/or respective users 16 of the system 10 (e.g., the Social Betwork™) with rewards, ratings and/or statuses based on the received prediction and/or confirmation data in association with the validated event outcome which can increase engagement. Such incentives and statuses can include, but are not limited to, publically visible status indicators and gamification (e.g. gear for a profile avatar, badges on a leaderboard, etc.), free wagering funds, memorabilia, and prizes. A user 12 and/or respective users 16 of the system 10 (e.g., the Social Betwork™) and/or external data source(s) 24 can submit prediction data and confirmations with or without participating in a wager related to the event and outcome. It should be understood that FIG. 1B is only one potential configuration, and the system 10 of the present disclosure can be implemented using a number of different configurations.

Figure 2:
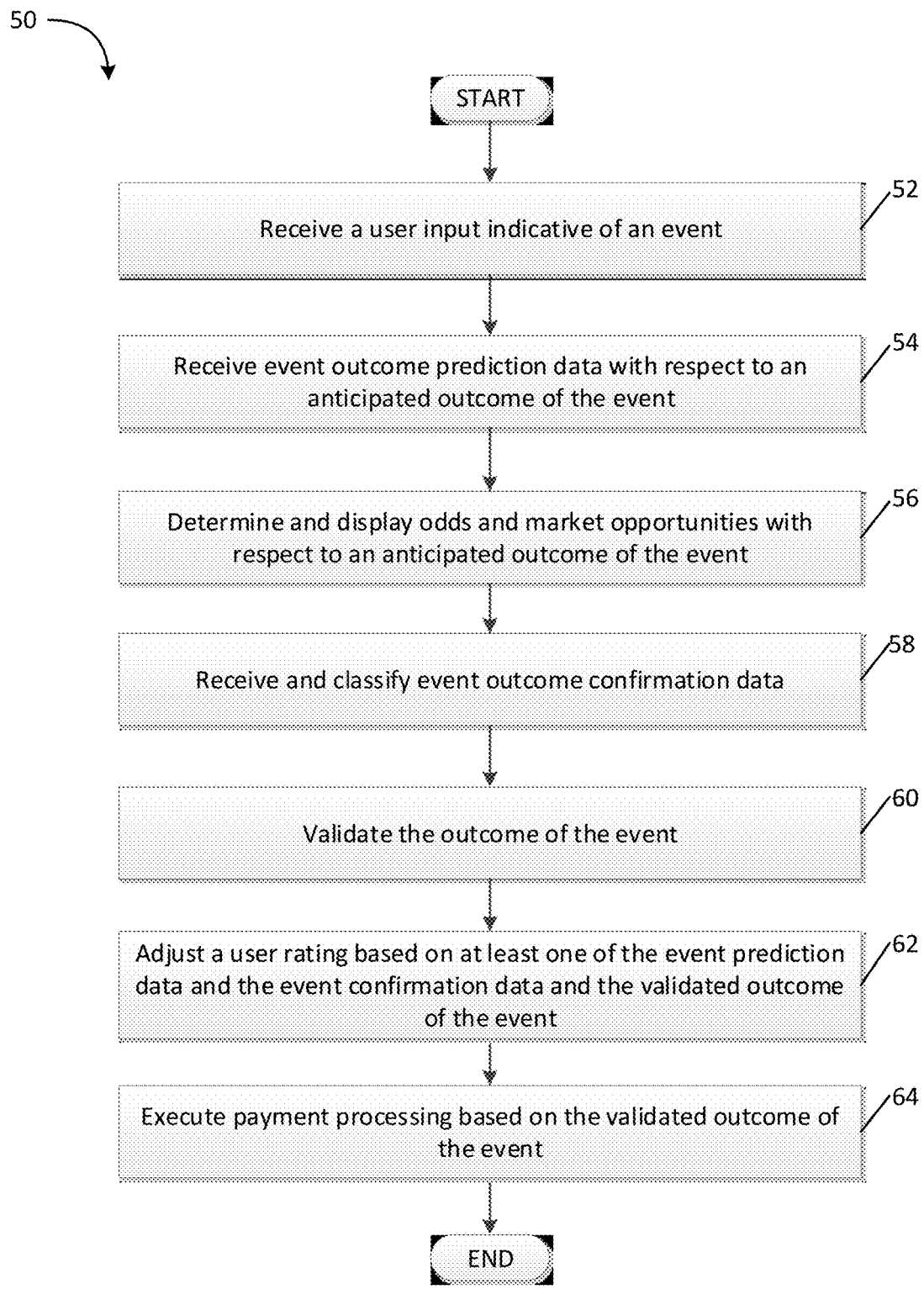
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 receives a user input indicative of an event. An event can be a known event with one or more associated objective outcomes. For example, an objective outcome can include, but is not limited to, a final score of an event or a winner of an event. An event can also have a plurality of types of objective outcomes, each of which can be predicted, wagered on, and/or confirmed via the system 10 by a user 12. For example, a plurality of types of objective outcomes can include, but are not limited to, a placement of respective participants in an event (e.g., first, second, and third in a race) or a combination of placements; statistics of participants in multiple events occurring in a given day or time period (e.g., points, rebounds, assists, etc., during a particular round of or during an entirety of a Basketball Tournament); a descending order of such statistics (e.g., most points, second most points, etc.) or a combination thereof; or statistics of respective participants in an individual event (e.g., a highest score, longest survival period, the best gear, etc. in an esports match).

In step 54, the system 10 receives prediction data indicative of a prediction of an outcome of the event. For example, prior to a commencement of an event a user 12 can input a prediction indicative of an outcome the user 12 believes will occur. It should be understood that the system 10 can receive a plurality of predictions from respective users of the system 10 (e.g., the Social Betwork™) and/or external data source(s) 24 and that the users and/or the external data source(s) 24 can input these respective predictions with or without participating in a wager related to the event and outcome, and that wagers themselves can be used as a form of prediction data. It should also be understood that the system 10 can utilize user wager input data as a variable in prediction data and to determine a prediction rating of a user as described in further detail below.

Then, in step 56, the system 10 determines and displays odds and market opportunities with respect to at least one anticipated outcome associated with the generated event. A user 12 can communicate with and wager in any third-party wagering system 20 coupled to the system 10 via an application programming interface (API). A third-party system can include, but is not limited to, a peer-to-peer network, a pool, a conventional sportsbook, a market place, or an exchange based system.

In step 58, the system 10 receives and classifies event outcome confirmation data. For example, at a conclusion of an event, the system 10 can receive confirmation data indicative of an event outcome from a user 12. It should be understood that the system 10 can receive a plurality of confirmations from respective users of the system 10 (e.g., the Social Betwork™) and/or external data source(s) 24 and that the users and/or the external data source(s) 24 can input these respective confirmations with or without participating in a wager related to the event and outcome. Additionally, the system 10 can source confirmation data from users of the system 10 based on respective user metadata (e.g., geolocation, date, time, etc.) and/or from the external data source(s) 24.

In step 60, the system 10 validates an outcome of the event based on the received confirmation data. Then, in step 62, the system 10 adjusts a user prediction rating and/or a user confirmation rating based on the received event outcome prediction data and/or event confirmation data compared to the validated event outcome. The system 10 can also adjust an external data source 24 prediction rating and/or an external data source 24 confirmation rating based on the received event outcome prediction data and/or event confirmation data compared to the validated event outcome.

Lastly, in step 64, the system 10 executes payment processing with respect to a wager associated with a validated event outcome. In particular, the system 10 identifies a user 12 associated with a wager, determines whether the wager is eligible for payment (e.g., whether the wager is a winning wager), determines a payment amount based on the wager, notifies the user 12 of the payment amount, and transmits the payment to the user 12. It should be understood that a third-party payment processor in communication with the system 10 can execute payment processing, and that such payments can account for regulatory or compliance measures (e.g. withholding taxes, reviewing payment patterns for money laundering, etc.).

The system 10 can grant a user 12 various ratings and/or statuses based on a utilization of the system 10. The statuses provide for the system 10 to give greater weight to contributions of the user 12 and indicate to other users of the system 10 (e.g., the Social Betwork™) that such contributions are "trusted". For example, a user 12 that submits several accurate event outcome predictions can realize a high prediction rating and thereby have his or her predictions weighted more heavily in displaying predicted odds (as described below in relation to FIGS. 5 and 9). In another example, an external data source 24 that submits several accurate event outcome predictions can realize a high prediction rating and thereby have his or her predictions weighted more heavily in displaying projected odds (as described below in relation to FIGS. 5 and 9). In yet another example, a user 12 or external data source 24 having accurately confirmed a predetermined threshold of event outcomes can realize a "trusted" status. This status can increase user confidence in wagering pools that said "trusted" sources create within the system 10. A user 12 can receive incentives for achieving such ratings and/or statuses, which can increase engagement. Such incentives and statuses can include, but are not limited to, publically visible status indicators and gamification (e.g. gear for a profile avatar, badges on a leaderboard, etc.), free wagering funds, memorabilia, and prizes. The system 10 can leverage these ratings and/or statuses to suggest future event wagering pools to users.

Figure 3:
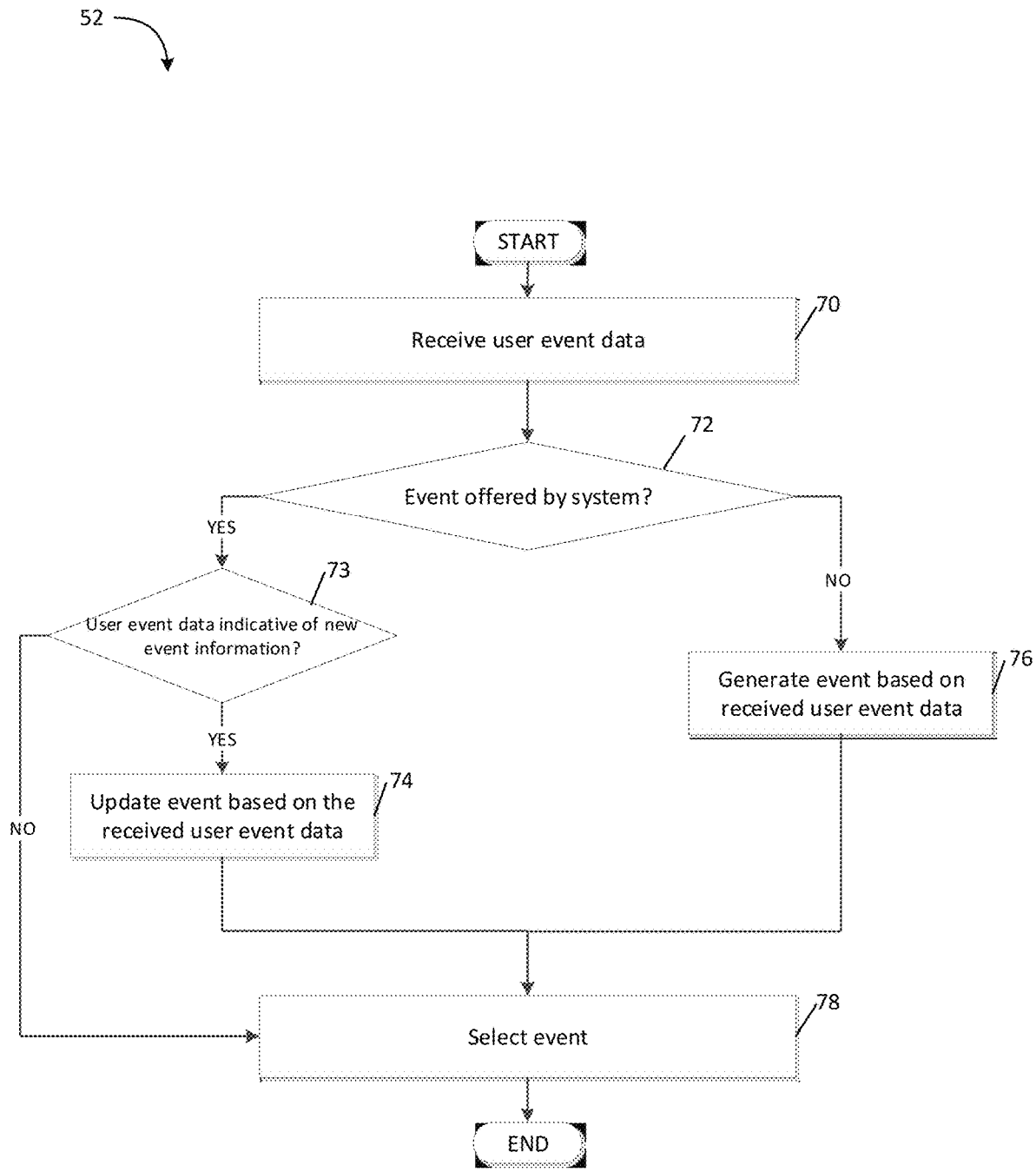
FIG. 3 is a flowchart illustrating step 52 of FIG. 2 in greater detail.

FIG. 3 is a flowchart illustrating step 52 of FIG. 2 in greater detail. In step 70, the system 10 receives event data from a user. The user event data can include, but is not limited to, a name of the event, a location of the event, a date and time of the event, an event type, the contestants participating in the event, the teams or players participating in the event, and the win conditions of any wager related to the event. In step 72, the system 10 determines whether the received user event data is indicative of an event that is already offered by the system 10. The event can be a known event with one or more associated objective outcomes. For example, the event can be a conventional and/or well-known event (e.g., the Super Bowl) or a non-conventional and/or lesser-known event (e.g., the Super Smash Bros. Ultimate World Championship). Additionally, an objective outcome can include, but is not limited to, a final score of an event or a winner of an event. It should also be understood that an event can have a plurality of types of objective outcomes, each of which can be wagered on via the system 10. For example, a plurality of types of objective outcomes can include, but are not limited to, a placement of respective participants in an event (e.g., first, second, and third in a race) or a combination of placements; statistics of participants in multiple events occurring in a given day or time period (e.g., points, rebounds, assists, etc., during a particular round of or during an entirety of a Basketball Tournament), a descending order of such statistics (e.g., most points, second most points, etc.) or a combination thereof; or statistics of respective participants in an individual event (e.g., a highest score, longest survival period, the best gear, etc. in an esports match).

If the event is offered by the system 10, then the process proceeds to step 73 and the system 10 determines whether the user event data is indicative of new event information (e.g. additional contestants, wagering outcomes, etc). If the user event data is indicative of new event information, then the process proceeds to step 74. In step 74, the system 10 updates the event based on the received user event data to include the new event information. If the user event data is not indicative of new event information, then the process proceeds to step 78 and, in step 78, the system 10 selects the event. Alternatively, if the event is not offered by the system 10, then the process proceeds to step 76. In step 76, the system generates the event based on the received user event data. In step 78, the user 12 selects the event.

It should be understood, that the system 10 can restrict a user 12 from generating or updating an event based on a confirmation rating status thereof where the confirmation rating or status is indicative of a trustworthiness of the user 12. For example, a user 12 can earn a high confirmation rating status (e.g., a "Trusted User" status) based on accurately confirming a threshold of event outcomes. As such, the system 10 can limit a non "Trusted User" from generating and opening an event to the public to provide confidence that an event can be accurately confirmed by at least one Trusted User. The system 10 can also restrict a population of available events to provide confidence that each available event will have a sufficient number of users and confirmation data sources to validate an outcome of each respective available event and wagering pool. It should also be understood that the system 10 can account for the regulatory aspects of creating and hosting such an event (e.g., municipal, state and/or federal regulatory compliance or taxes), particularly if wagering or other incentives are involved. For example, the system 10 can specifically designate a licensed institution to allow the licensed institution to host events in one or more specific jurisdictions such that the system 10 can restrict the display or wagering on such events to specific users that are legally allowed to participate. These regulatory compliance features can employ technology including, but not limited to, geofencing, identity verification, and location limited databases.

Figure 4A:
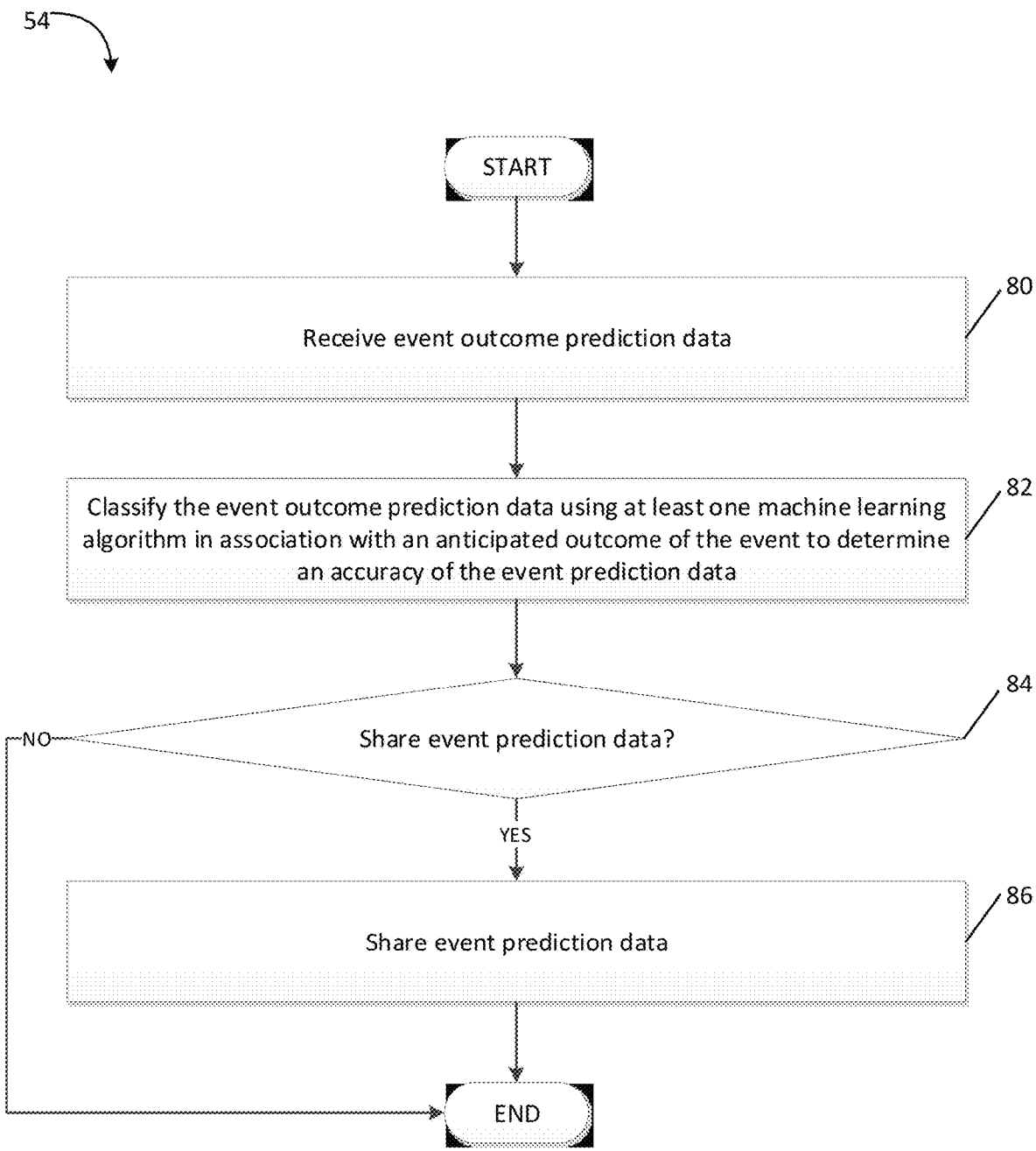
FIG. 4A is a flowchart illustrating step 54 of FIG. 2 in greater detail.

FIG. 4A is a flowchart illustrating step 54 of FIG. 2 in greater detail. As mentioned above, the system 10 can receive event outcome prediction data from respective users of the system 10 (e.g., the Social Betwork™) and/or external data source(s) 24 where the users and/or the external data source(s) 24 can input predictions with or without participating in a wager related to the event and anticipated outcome. An external data source 24 can include, but is not limited to, an organizer of the event (e.g., a professional sports league), a broadcaster of an event (e.g., a sportscaster and/or cable network, a streaming application or a web site), a sponsor of an event (e.g., a company or a non-profit), and a data vendor.

In step 80, the system 10 stores the event prediction data. As described in further detail below with respect to FIGS. 5 and 9, the system 10 can utilize the event prediction data to assign or adjust prediction ratings of respective users of the system 10 (e.g., the Social Betwork™) and/or external data source(s) 24 and can utilize these ratings to determine and display odds with respect to an anticipated outcome of an event. In step 82, the system 10 filters, categorizes, and ranks the stored prediction data using at least one machine learning algorithm in association with an anticipated outcome of the event. In step 84, the system 10 can prompt a user or an external data source 24 to share his/her prediction with respective users of the system 10 (e.g., the Social Betwork™). If a user 12 or an external data source 24 does not share his/her prediction then the process ends. Alternatively, if a user 12 or an external data source 24 shares his/her prediction, then in step 86 the system 10 provides for the prediction to be available to respective users of the system 10 (e.g., the Social Betwork™). It should be understood that step 84 is optional and that the system 10 need not prompt a user 12 or an external data source 24 to share his/her prediction.

As described in further detail below with respect to FIG. 9, the system 10 can determine whether prediction data received from a user 12 or an external data source 24 is correct based on the validated event outcome and can assign or update a prediction rating accordingly. It should be understood that a user 12 or external data source 24 can also share his/her prediction rating with his/her prediction. Sharing a prediction and/or prediction rating can provide valuable insight into a probable outcome of an event and engage other users of the system 10 (e.g., the Social Betwork™). It should be understood that a user 12 can also share his or her wagers and/or confirmation data.

Figure 4B:
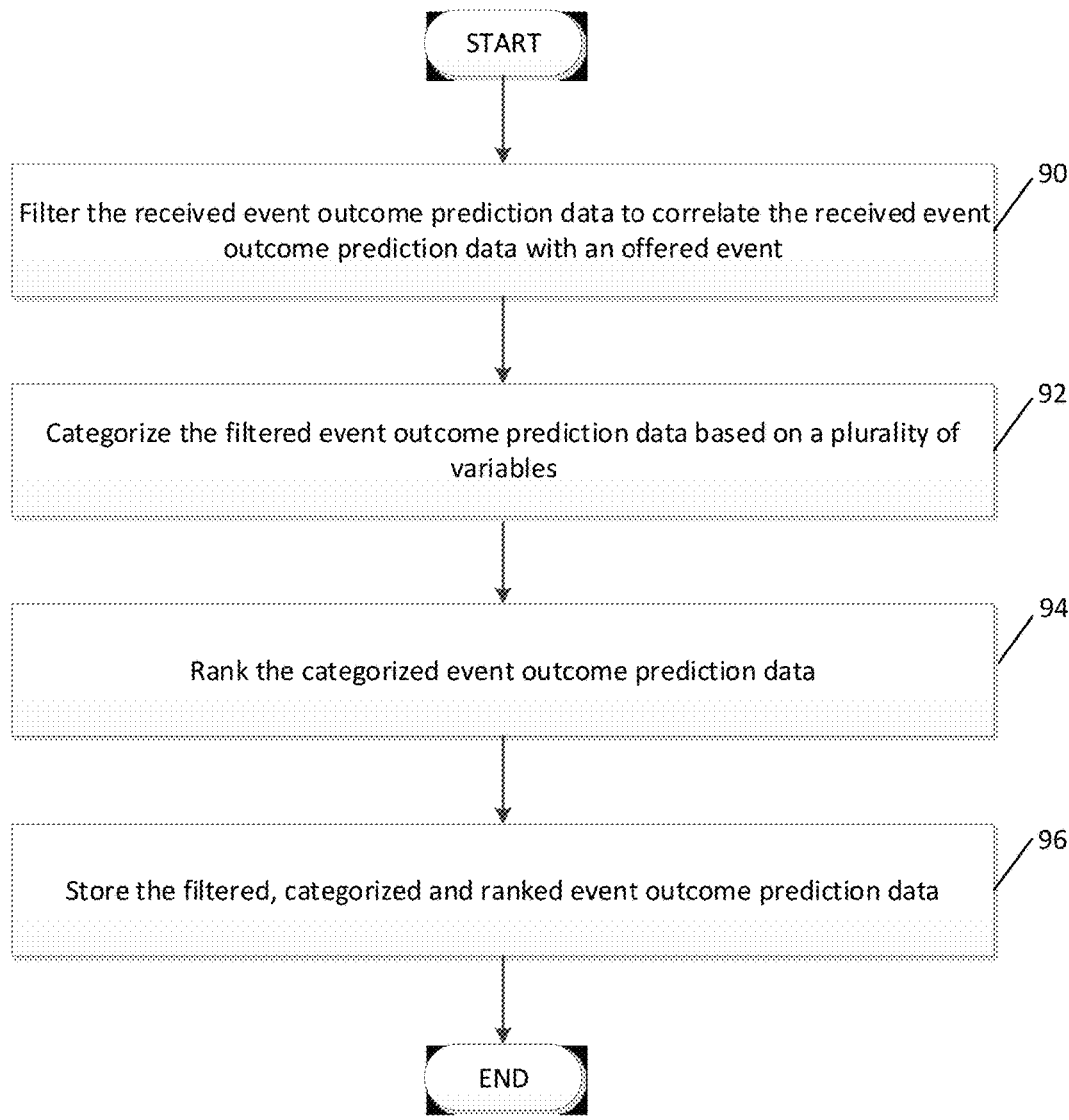
FIG. 4B is a flowchart illustrating step 82 of FIG. 4A in greater detail.

FIG. 4B is a flowchart illustrating step 82 of FIG. 4A in greater detail. In particular, FIG. 4B illustrates processing steps carried out by the system 10 to classify the stored event outcome prediction data by filtering, categorizing, and ranking the data using at least one machine learning algorithm in association with an anticipated outcome of an event. In step 90, the system 10 utilizes at least one natural language processing (NLP) technique to filter the received event prediction data to correlate the received event prediction data with an event offered by the system 10. A natural language processing technique can include, but is not limited to, named entity recognition (NER), sentiment analysis (e.g, naive Bayes, random forest, and gradient boosting), text summarization (e.g., LexRank, TextRank, and latent semantic analysis), aspect mining and topic modeling (e.g., latent semantic analysis, probabilistic latent semantic analysis, latent dirichlet allocation, and correlated topic model). For example, the system 10 could utilize an NLP technique to filter a social media post stating "The Pack is going to dominate the 49ers tomorrow" as an event outcome prediction of the Green Bay Packers defeating the San Francisco 49ers, which is an event offered by the system 10 with a start time of the following day. As mentioned above, an event can be a known event with one or more associated objective outcomes. For example, the event can be a conventional and/or well-known event (e.g., the Super Bowl) or a non-conventional and/or lesser-known event (e.g., the Super Smash Bros. Ultimate World Championship). It should be understood that NLP can be utilized to filter. It should be understood that in addition to NLP, the system can receive a user input to determine an event type. In step 92, the system 10 categorizes the filtered prediction data based on a plurality of variables including, but not limited to, a time and date of the prediction data, a geolocation associated with the prediction data, associated metadata, and the prediction data source. Then, in step 94, the system 10 ranks the categorized prediction data utilizing at least one machine learning algorithm to determine an associated weight of each prediction to be utilized in determining and displaying odds as described in FIG. 5. For example, the system 10 can rank the categorized prediction data according to the historical accuracy of a prediction data source. In step 96, the system 10 stores the filtered, categorized and ranked prediction data (e.g., classified prediction data).

Figure 5:
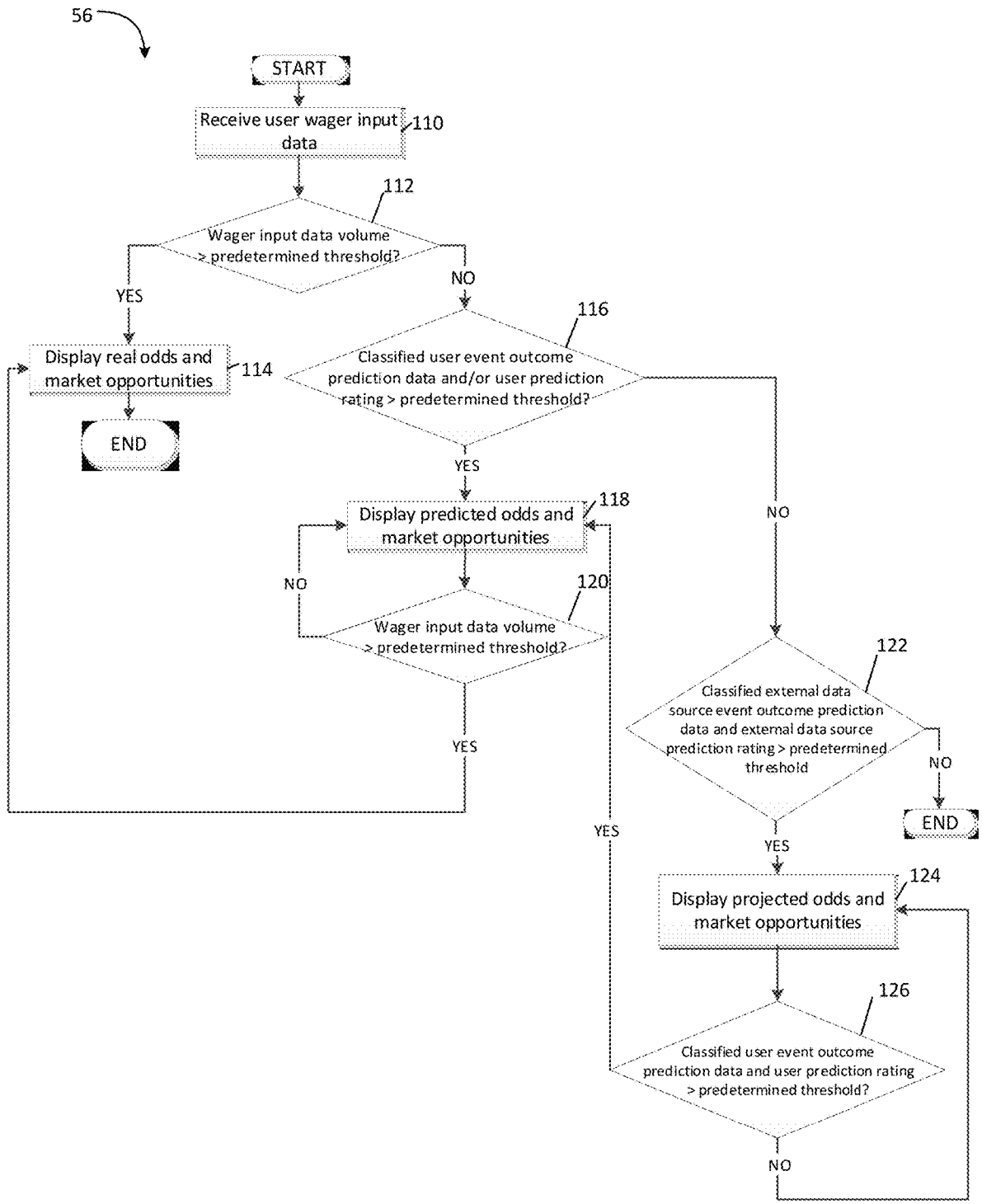
FIG. 5 is a flowchart illustrating step 56 of FIG. 2 in greater detail.

FIG. 5 is a flowchart illustrating step 56 of FIG. 2 in greater detail. In particular, FIG. 5 illustrates processing steps carried out by the system 10 to determine and display odds of a wager associated with an anticipated outcome of an event. If a number of wagers entered is insufficient to determine and display real (e.g., live) odds, the real odds can be misleading because the real odds may generally not reflect the true (e.g., accurate) odds of the wager associated with the anticipated event outcome. As such, the system 10 can utilize classified user event outcome prediction data in conjunction with user prediction ratings as described in FIG. 9A to determine and display user predicted odds and/or utilize classified external event outcome prediction data in conjunction with external data source prediction ratings as described in FIG. 9A to determine and display projected odds. The system 10 can also determine the projected odds based on classified external data source event outcome prediction data and/or external data source prediction ratings in combination with predicted odds. As described in detail below, the system 10 can utilize input data, applied statistical techniques, and/or at least one machine learning algorithm to determine and display the probable accurate odds of a wager associated with an anticipated outcome of an event based on whether a number of wagers entered by respective users provides for determining and displaying real odds. It should be understood that machine learning models can be utilized to optimize and increase an efficiency of the system 10 with respect to refining the predicted odds weighting system after the event outcome has been validated. The system 10 can also utilize machine learning models based on received user event outcome prediction data to optimize the presentation of the graphical user interface such that users of the system 10 (e.g., the Social Betwork™) can be prompted with events that the users are more likely to engage with and accurately predict.

In step 110, the system 10 receives user wager input data indicative of a selected event and associated outcome(s) from the user 12. A user 12 can wager an amount associated with an event outcome in the wagering system 20. As described below, odds associated with a wager can be adjusted based on a received volume associated with the user wager input data (e.g., users adding to each selected outcome in a wagering system 20). It should be understood that a user 12 can wager and that odds can change until the wagering period is closed (e.g., a start time of the selected event). It should also be understood that the odds are determined for each wager when the wagering period is closed. Such dynamic odds are popularly known as pari-mutuel and preclude the need for an administrator to manually create and adjust odds.

In step 112, the system 10 determines whether a received volume of user wager input data is greater than a first predetermined threshold (e.g., sufficient to display real odds). In particular, the system 10 utilizes a statistical methodology to determine if a volume of user wager input data is sufficient to display the real odds based on whether the system 10 has confidence in the accuracy of the odds. If the system 10 determines that a volume of user wager input data is greater than the first predetermined threshold (e.g., sufficient within a defined confidence threshold), then the process proceeds to step 114 and in step 114, the system 10 displays the real odds and associated market opportunities. For example, if the system 10 receives and processes one million dollars associated with an event (e.g., the Super Bowl) having a binary outcome (e.g., whether Team A or Team B will win), then the system 10 displays real odds based on the received volume. It should be understood that conventional and well-known events can receive a high volume of user wager input data and, as such, real odds are more likely to be displayed for these events.

Alternatively, if the system 10 determines that a volume of user wager input data is less than the first predetermined threshold, (e.g., not sufficient to display real odds), then the process proceeds to step 116 and, in step 116, the system 10 determines whether the classified user event outcome prediction data and/or user prediction ratings are greater than a second predetermined threshold (e.g., sufficient to display predicted odds). In particular, the system 10 utilizes a statistical methodology to determine the second predetermined threshold and whether the stored volume of classified user event outcome prediction data and/or user prediction ratings are greater than the second predetermined threshold (e.g., sufficient to display the predicted odds).

If the system 10 determines that the classified event outcome prediction data and/or user prediction ratings are greater than the second predetermined threshold, then the process proceeds to step 118 and, in step 118, the system 10 displays the predicted odds and associated market opportunities. Alternatively, if the system 10 determines that the classified event outcome prediction data and/or user prediction ratings are less than the second predetermined threshold (e.g., not sufficient to display the predicted odds), then the process proceeds to step 122. In step 120, the system 10 determines whether the received volume of user wager input data is greater than the first predetermined threshold (e.g., sufficient to display real odds).

If the system 10 determines that the received volume of user wager input data is greater than the first predetermined threshold (e.g., sufficient to display the real odds), then the process returns to step 114 and the system 10 displays the real odds and associated market opportunities. Alternatively, if the system 10 determines that the received volume of user wager input data is less than the first predetermined threshold (e.g., not sufficient to display the real odds), then the process returns to step 118 and the system 10 displays the predicted odds and associated market opportunities. It should be understood that if the system 10 has not received a volume of wager input data sufficient to display the real odds and associated market opportunities, then the system 10 displays the predicted odds and associated market opportunities until a sufficient volume of wager input data is received.

In step 122, the system 10 determines whether classified external data source event outcome prediction data and/or external data source prediction ratings (as described below in FIG. 9A) are greater than a third predetermined threshold (e.g., sufficient to display projected odds). If the system 10 determines that the classified external data source event outcome prediction data and/or external data source prediction ratings are greater than the third predetermined threshold (e.g., meets a confidence threshold), then the process proceeds to step 124. Alternatively, if the system 10 determines that the classified external data source event outcome prediction data and/or external data source prediction ratings are less than the third predetermined threshold, then the process ends and the system 10 does not display odds with respect to a selected event and the associated outcome the user desires to wager on.

In step 124, the system 10 displays the projected odds and associated market opportunities. Then, in step 126, the system 10 determines whether the classified user event outcome prediction data and/or user prediction ratings are greater than the second predetermined threshold (e.g., sufficient to display predicted odds). If the system 10 determines that the classified user event outcome prediction data and/or user prediction ratings are greater than the second predetermined threshold, then the process returns to step 118 and, in step 118, the system 10 displays the predicted odds and associated market opportunities. Alternatively, if the system 10 determines that the classified user event outcome prediction data and/or user predictions ratings are less than the second predetermined threshold, then the process returns to step 124 and the system 10 displays the projected odds and associated market opportunities. It should be understood that if the system 10 has not received classified event outcome prediction data and/or prediction ratings sufficient to display the predicted odds and associated market opportunities, then the system 10 displays the projected odds and associated market opportunities until sufficient classified user event outcome prediction data and/or user prediction ratings are received.

It should be understood that the projected odds can also incorporate the predicted odds into a weighted projection. For example, if a user 12 generates a new pool associated with a conventional and well-known event (e.g., the Super Bowl), a volume of received user wager input data for the pool can be insufficient to display the real odds because the pool was recently generated. However, since the pool is associated with a conventional and well-known event, prediction data can be readily available. As such, the system 10 can utilize classified user event outcome prediction data and user prediction ratings and/or classified external event outcome prediction data and external data source prediction ratings to display user predicted odds or projected odds until the system 10 receives a sufficient volume of wager input data for the pool to display the real odds. Accordingly, the system 10 can display projected odds that provide a user with a better understanding of the probable odds when the event begins and before the system 10 determines and displays the true odds. It should be understood that the system 10 can display the predicted odds, external or consolidated projected odds, and real odds concurrently, while highlighting market opportunities based on any differences between these odds and the relative confidence that the system 10 has in each.

As described above, the system 10 utilizes wagering data (e.g., volume, currency, etc.), user prediction data and/or external prediction data sourced from a user 10, community 16, and/or external data sources 24 to determine and display odds. The system 10 utilizes at least one machine learning algorithm to leverage these data sources to automatically determine, refine and display market conditions to guide market participants (e.g., users) towards the generation of an efficient market and opportunities within the market. For example, as the system 10 receives an increasing volume and liquidity of wagers and event outcome predictions, it can provide mechanisms for a user 12 to determine, refine and display market conditions efficiently to execute a more efficient wager for a desired outcome.

As such, the system 10 provides an algorithm that determines, refines and displays market conditions of a given event outcome. For example, with respect to wager input data (as shown in FIG. 5), if a golfer A has 8:1 real odds to win an event but the classified user event outcome prediction data is indicative of 6:1 predicted odds, the system 10 can highlight and display this discrepancy to a user 12 as a market opportunity alongside the real odds displayed in step 114. The system 10 can also highlight and display supporting data points (e.g., Golf Expert 1, having a high prediction rating, predicts golfer A will win the event and User B having a "Trusted User" status predicts the same). Additionally, the system 10 can also recommend a wager and wager amount that a user 12 could execute to extract a maximum value from this discrepancy.

It should be understood that for a wagering marketplace, the system 10 can utilize the classified event outcome prediction data and real odds to execute various functions including, but not limited to: determining an optimal purchase price of a wager, determining an optimal sale price, identifying arbitrage opportunities and other hallmarks of efficient markets. It should also be understood that the system 10 can leverage any combination of wagering data, user event outcome prediction data, and/or external data source event outcome prediction data to execute the various functions during the odds determination and display process to automatically determine, refine and display market opportunities. These functions are described in more detail below.

The system 10 can determine an optimal purchase price among various real odds in a pool. The system 10 can compare predicted odds (as determined in step 118 of FIG. 5), projected odds (as determined in step 124 of FIG. 5), and real odds (as shown in step 114 of FIG. 5 based on wagering data). The system 10 can recommend an optimal purchase price and volume for a user 12 based on a relative statistical confidence of each of the predicted odds, projected odds and real odds. For example, assume the Los Angeles Lakers are playing the Boston Celtics in a basketball game, and a wagering pool is set up to determine the winner, the classified user event outcome prediction data yields for the Lakers 2× predicted odds (+100 or 1:1 in gambling vernacular)+/−0.2× based on a 95% statistical confidence interval, and the real odds, based on the wager data, allow a user 12 to wager on a 3× payout that the Lakers win. Based on this assumption, the system 10 can recommend and display a market opportunity that the user 12 wager on the Lakers and calculate an optimal purchase price and volume that would shift the real odds to a level of confidence desired by the user 12. In this case, the system 10 could recommend, based on a volume of wager data on each side, that the user 12 bet $X to shift the real odds to a 2.21× payout on the Lakers winning. In this way, the user 12 receives real odds that the system 10 is statistically confident are favorable at a largest possible volume. It should be understood that, while the aforementioned example considers two anticipated event outcomes (Lakers or Celtics win), the system 10 can simultaneously determine recommended purchases across wagering pools with multiple anticipated event outcomes. The system 10 can also determine (in real time) an optimal sale price for a prospective seller (e.g. a licensed casino operator or peer to peer wagerer) that wishes to offer a wager to a user 12. The system 10 can identify an optimal sale price and volume based on a lowest available price for an event outcome sans a minimum increment, generally $0.01, which considers volume and liquidity. The system 10 can also determine and suggest price points for a seller based on a volume of wager data and pools available to users, and an amount of wagers that the seller would like to accept. If lowest offered real odds associated with an anticipated event outcome are above the predicted odds (e.g., the real odds are beneficial to the buyer), the system 10 can recommend that a seller offer to sell a different anticipated event outcome in the same pool where the real odds would yield a positive expected return for the seller. The system 10 can consider a relative volume of the share price offerings and recommend a price to maximize an expected return with reasonable liquidity to the seller. It should be understood that the system 10 can utilize machine learning to optimize a recommended price and volume, in addition to other indicators, for a user 12 and/or users 16 (e.g., the Social Betwork™).

The system 10 can also determine (in real time) arbitrage opportunities for a buyer and seller. In particular, the system 10 can sample prices and volumes offered for event outcomes and wagers across the system 10 to determine whether an arbitrage exists. For example, assume an event has two mutually exclusive and collectively exhaustive outcomes (e.g., the winner of a basketball game) where a first outcome has a lowest sales price of $0.55 and a second outcome has a lowest sales price of $0.51 and each outcome pays out $1.00 with no fees. Since the winning outcome yields $1.00, purchasing the first and second outcomes yields a total sales price=$1.06 (e.g., $0.55+$0.51) such that an arbitrage on the sell side is available. Namely, a participant can offer a lower sales price for each of the first and second outcomes (e.g., a third outcome having a lowest sales price of $0.54 and a fourth outcome having a lowest sales price of $0.50) yielding $1.04 in sales on the event for each $1.00 obligation. This secures a $0.04 arbitrage for the seller and drives the market closer to an efficiency point of $1.00. The system 10 can utilize the classified prediction data (as shown in FIG. 4B) to further recommend an optimal amount by which a seller can lower the price for the first and second outcomes.

The system 10 can also determine (in real time) an aggregate outcome tiered volume for a prospective sale or purchase of shares scenario. Referring to the aforementioned sales arbitrage example above, if buyers wager on only one side of the market (e.g., buyers buy the fourth outcome at $0.50), a seller can be exposed to a loss on the fourth outcome despite the seller's attempt to sell the third and fourth outcomes together at a guaranteed profit. The system 10 can address this scenario by considering a maximum exposure of the seller and preventing sales of his/her shares of one outcome at a predetermined volume until a requisite volume of the other outcome is purchased. It should be understood that this aggregate outcome tiered volume can be applied by the system 10 outside of a sales arbitrage opportunity to limit a seller's exposure to various outcomes based on a risk tolerance of the seller. The system 10 can utilize event data, event outcome prediction data, and real odds to determine confidence intervals of risk within the system 10 and can recommend volumes and prices accordingly.

It should be understood that the system 10 can also identify and display buy-side arbitrage market opportunities (e.g., a purchase arbitrage). For example, assume an event has three mutually exclusive and collectively exhaustive outcomes such that a first event outcome has a lowest price of $0.20, a second outcome is for sale at $0.30 and a third outcome is for sale at $0.45. Purchasing a share of each of the first, second and third outcomes costs $0.95 with a guaranteed payout of $1.00. As such, the system 10 can determine a number of shares available at these prices and recommend that a user 12 execute consolidated purchases across the market. This guarantees an arbitrage for the buyer. It should be understood that the system 10 can simultaneously calculate and display these arbitrage opportunities across multiple events, wagering pools, and event outcomes.

Figure 6:
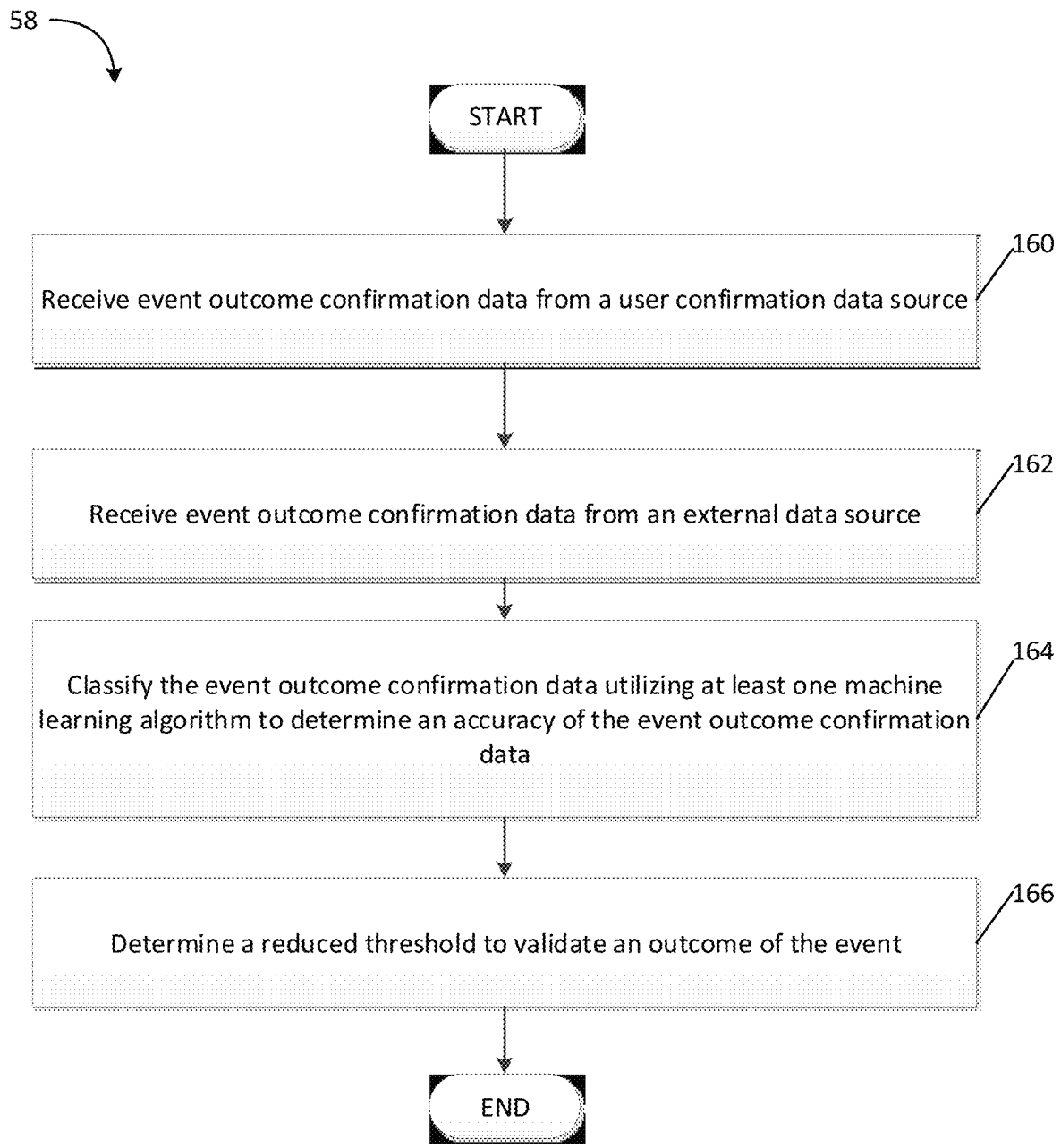
FIG. 6 is a flowchart illustrating step 58 of FIG. 2 in greater detail.

FIG. 6 is a flowchart illustrating step 58 of FIG. 2 in greater detail. As mentioned above, a generated event can include a plurality of outcomes where each event outcome requires confirmation and validation. For example, a sports match can have event outcomes including, but not limited to, a result of a coin toss, a length of a national anthem, and a score for each quarter of play. As such, the system 10 receives confirmation data from various sources to validate each event outcome.

In step 160, the system 10 receives confirmation data with respect to an event outcome from a user 12 and/or respective users 16 of the system 10 (e.g., the Social Betwork™). The user event outcome confirmation data can include, but is not limited to, text, a photograph of the event outcome, a video of the event outcome, a social media post (e.g., a Tweet), and a link to a reputable data source (e.g., a paid or official data source or vendor). A user 12 and/or respective users 16 of the system 10 can input event outcome confirmation data with or without participating in a wager related to the event and outcome. It should be understood that the system 10 can source event outcome confirmation data from a user 12 and/or users 16 of the system 10 based on respective user metadata (e.g., geolocation, date, time, etc.). Additionally, the system 10 can incentivize a user 12 and/or users 16 of the system 10 to submit accurate event outcome confirmation data via incentives including, but not limited to, a badge or aesthetic recognition visible to other users 16 within the system 10, a "freeplay" into a wager, tournament, and/or local experience with a wagering system 20 (e.g., a casino or operator), event merchandise, and a commission percentage for providing accurate event outcome confirmation data. As described in further detail below, the system 10 can assign each user a confirmation rating based on an accuracy of the event outcome confirmation data provided by each user and the system 10 can leverage these confirmation ratings to weight user event outcome confirmation data to validate a confirmed outcome of an event.

In step 162, the system 10 receives external event confirmation data with respect to an event outcome from an external data source 24. The event outcome confirmation data can include, but is not limited to, text, a photograph of the event outcome, a video of the event outcome, a social media post (e.g., a Tweet), a link to a reputable data source (e.g., a paid or official data source or vendor). An external data source 24 can include, but is not limited to, publicly shared social media data, user data, mined data, scraped internet data, manually sourced data by an administrator, an odds provider, a social media user, official data associated with an event and released by an organizer of the event (e.g., a professional sports league), a journalist, a broadcaster of an event (e.g., a sportscaster and/or cable network, a streaming application or a website), a journalist, a sponsor of an event (e.g., a company or a non-profit), an industry expert, a third party data provider and a data vendor.

It should be understood that an external data source 24 can submit event outcome confirmation data with or without participating in a wager related to the event and outcome. As described in further detail below, the system 10 can assign each external data source 24 a confirmation rating based on an accuracy of external event confirmation data provided by each external data source 24 and the system 10 can leverage these confirmation ratings to weight external event outcome confirmation data to validate a confirmed outcome of an event. These external data source confirmation ratings can be displayed publicly to inform a user 12 and/or users 16 of the system 10 of other participants present in wagering pools (e.g., a user may be more likely to participate in a wagering pool if the participants in the wagering pool and/or the host of the wagering pool has a "Trusted User" status indicative of a high confirmation rating).

In step 164, the system 10 classifies the received user event outcome confirmation data and the external event outcome confirmation data using at least one machine learning algorithm to determine an accuracy of the event outcome confirmation data to validate the outcome of the event. Lastly, in step 166, the system 10 determines a reduced threshold of user and/or external data confirmation data and/or user and/or external data confirmation sources required to validate an outcome of the event.

Figure 7A:
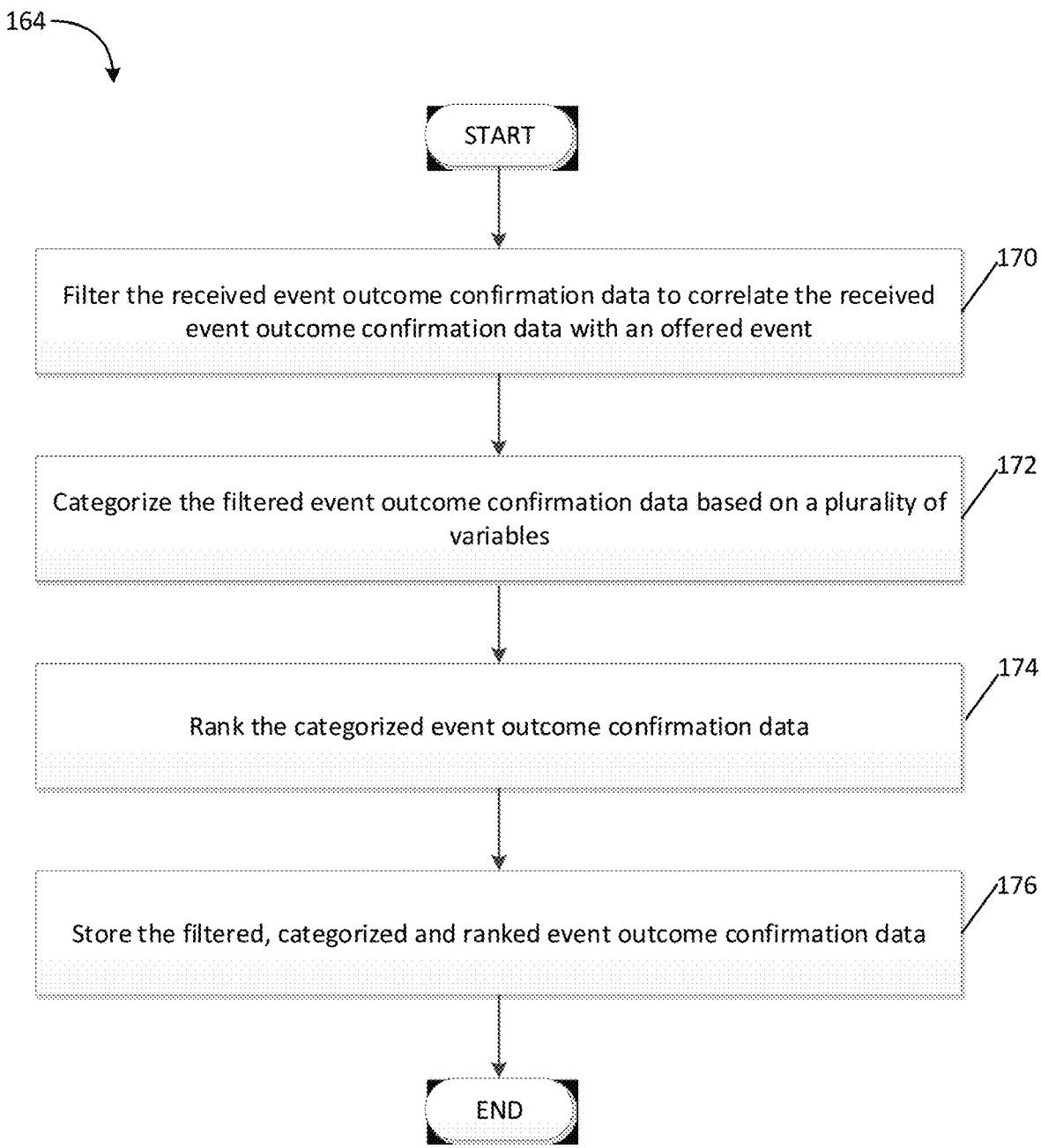
FIG. 7A is a flowchart illustrating step 164 of FIG. 6 in greater detail.

FIG. 7A is a flowchart illustrating step 164 of FIG. 6 in greater detail. In particular, FIG. 7A illustrates processing steps carried out by the system 10 to classify the received event outcome confirmation data by filtering, categorizing, and ranking the event outcome confirmation data using at least one machine learning algorithm in association with an outcome of an event. In step 170, the system 10 utilizes at least one natural language processing (NLP) technique to filter the received event confirmation data to correlate the received event confirmation data with an event offered by the system 10. A natural language processing technique can include, but is not limited to, named entity recognition (NER), sentiment analysis (e.g, naive Bayes, random forest, and gradient boosting), text summarization (e.g., LexRank, TextRank, and latent semantic analysis), aspect mining and topic modeling (e.g., latent semantic analysis, probabilistic latent semantic analysis, latent dirichlet allocation, and correlated topic model). For example, the system 10 can utilize an NLP technique to filter a social media post stating "The Pack was triumphant over the 49ers at Lambeau Field" as an event outcome confirmation of the Green Bay Packers defeating the San Francisco 49ers, which is an event offered by the system 10. As mentioned above, an event can be a known event with one or more associated objective outcomes. For example, the event can be a conventional and/or well-known event (e.g., the Super Bowl) or a non-conventional and/or lesser-known event (e.g., the Super Smash Bros. Ultimate World Championship). In step 172, the system 10 categorizes the filtered event outcome confirmation data based on a plurality of variables including, but not limited to, a time and date of the event outcome confirmation data, a geolocation associated with the event outcome confirmation data, associated metadata, and the confirmation data source.

Then, in step 174, the system 10 ranks the categorized event outcome confirmation data utilizing at least one machine learning algorithm to determine an associated weight of each event outcome confirmation data to be utilized in determining an accuracy of the event outcome confirmation data to validate the outcome of the event. The system 10 can balance received user event outcome confirmation data and received external event outcome confirmation data and can weight a type of confirmation data (e.g., text, a photograph of the event outcome, a video of the event outcome, a social media post and a link to a reputable data source) independently and/or in view of its associated confirmation data source. For example, the system 10 can weight a photo of an event outcome (e.g., a final score) more than a tweet stating the event outcome. Alternatively, the system 10 can weight a tweet associated with a reliable confirmation data source or "Trusted User" more than a photo associated with a less reliable confirmation data source. In step 176, the system 10 stores the filtered, categorized and ranked event outcome confirmation data (e.g., classified event outcome confirmation data).

Figure 7B:
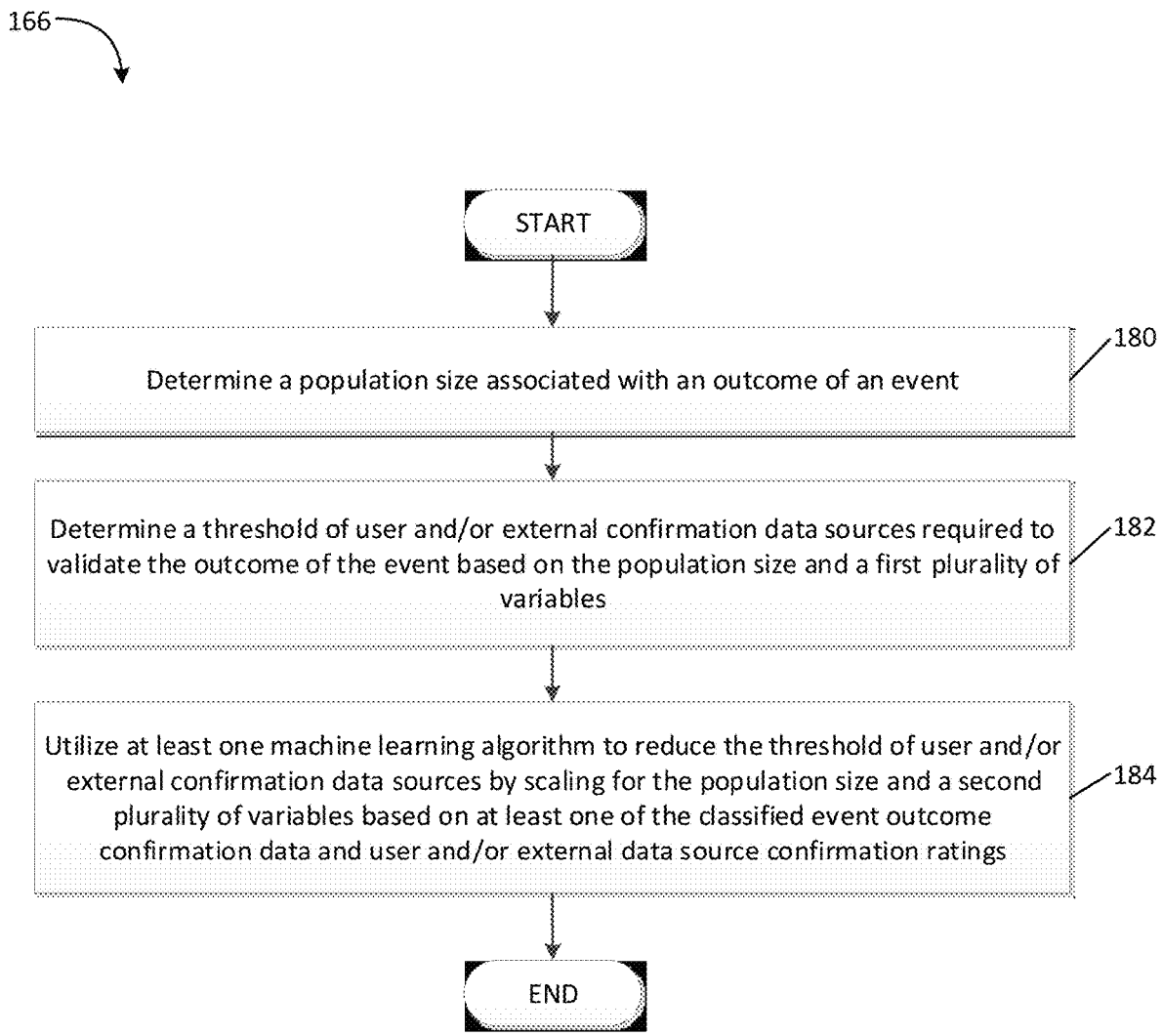
FIG. 7B is a flowchart illustrating step 166 of FIG. 6 in greater detail.

FIG. 7B is a flowchart illustrating step 166 of FIG. 6 in greater detail. In particular, FIG. 7B illustrates processing steps carried out by the system 10 to determine a threshold of data points (e.g., sample size) required to validate an outcome of an event, and reduce the threshold based on the classified confirmation data and/or confirmation data source ratings. In step 180, the system 10 determines a population size associated with an outcome of an event. The system 10 can determine a population size associated with an outcome of an event based on at least one factor associated with the outcome of the event, including but not limited to, a number of users wagering on the outcome of the event, a total value amount (e.g., USD) of wagers associated with the outcome of the event, and an amount of people watching the event (e.g., on a stream). In step 182, the system 10 determines a threshold (e.g., a sample size) of unique user confirmation data sources and/or external confirmation data sources required to validate an outcome of an event based on the population size and a first plurality of variables. The first plurality of variables can include, but are not limited to, a confidence interval, a margin of error, a sample size, an administrator input, a number of users wagering on the outcome of the event, a total value amount (e.g., USD) of wagers associated with the outcome of the event, and an amount of people watching the event (e.g., on a stream). For example, FIG. 7C is a diagram 200 illustrating a requisite sample size of confirmation data sources weighted equally to validate an outcome of an event for respective confidence intervals and margins of error based on a population size of the event. It should be understood that the system 10 can utilize one or more statistical techniques to determine the sample size (e.g., threshold).

Referring back to FIG. 7B, in step 184, the system 10 utilizes the classified event outcome confirmation data in conjunction with user and/or external data source confirmation ratings to reduce the threshold. In particular, the system 10 can utilize statistical techniques and/or a machine learning algorithm to reduce the threshold (e.g., reduce a number of unique confirmation data sources required to confirm an outcome of an event) by scaling for the population size and a second plurality of variables based on the classified event outcome confirmation data and/or external data source confirmation ratings. The second plurality of variables can include, but are not limited to, a confidence interval, a margin of error, a user confirmation rating, classified user confirmation data, an external data source confirmation rating, classified external confirmation data, an administrator input, a number of users wagering on the outcome of the event, a total value amount (e.g., USD) of wagers associated with the outcome of the event, and an amount of people watching the event (e.g., on a stream).

Based on each of a user confirmation rating and an external data source confirmation rating, the system 10 can advantageously reduce a number of unique confirmation data sources required to confirm an outcome of an event. For example, for a conventional and well-known event, such as the Super Bowl, the system 10 can reduce a number of unique confirmation data sources by receiving or sourcing confirmation data from reliable confirmation data sources such as well-known sports broadcasting networks (e.g., ESPN, CBS, and the NFL Network). Alternatively, a lesser-known event generally has a small wager size and number of participants, such as video game match between two players, and as such may require the entire population (e.g., both players) to confirm the same outcome thereof for the system 10 to validate the outcome of the event. The system 10 can reduce the number of unique confirmation data sources by receiving or sourcing confirmation data from reliable confirmation data sources such as users having respective high confirmation rating statuses. It should be understood that the system can reduce the required validation threshold of event outcome confirmation sources down to a single classified data source with a high confirmation rating (e.g. a single 'Trusted User' or administrator with a very high confirmation rating who submits a highly ranked classified data point for an event), thereby reducing the number of unique confirmation datasets (e.g., sample size) otherwise required to validate the outcome of the event.

The system 10 can also utilize a machine learning algorithm to leverage historical data of confirmation data sources and account for additional variables that can impact the relative weights of each of a user confirmation rating and an external data source confirmation rating. For example, the system 10 can decrease the relative weights of a user 12 having a high confirmation rating status for a particular event if the system 10 detects an anomaly based on the historical data (e.g., the user 12 has placed a larger than normal bet on an outcome associated with the event).

It should be understood that an event having multiple wagers (e.g., a high dollar amount), multiple outcomes, and/or several users associated therewith can require a greater amount of confirmation data to validate an outcome of an event than an event having fewer wagers, outcomes and users. For example, a complex event having multiple outcomes and dozens of users could require a greater amount of data than an event having a single wager between two users because the single wager would only require each user to confirm an outcome of the event. As described in detail below, the system 10 utilizes user confirmation data and external data confirmation data, confirmation ratings, applied statistical techniques, and/or machine learning to validate the outcome of the event. For example, the system 10 can determine the required quantity of data to execute a statistically significant validation within a confidence interval based on the relevant population size.

Figure 8:
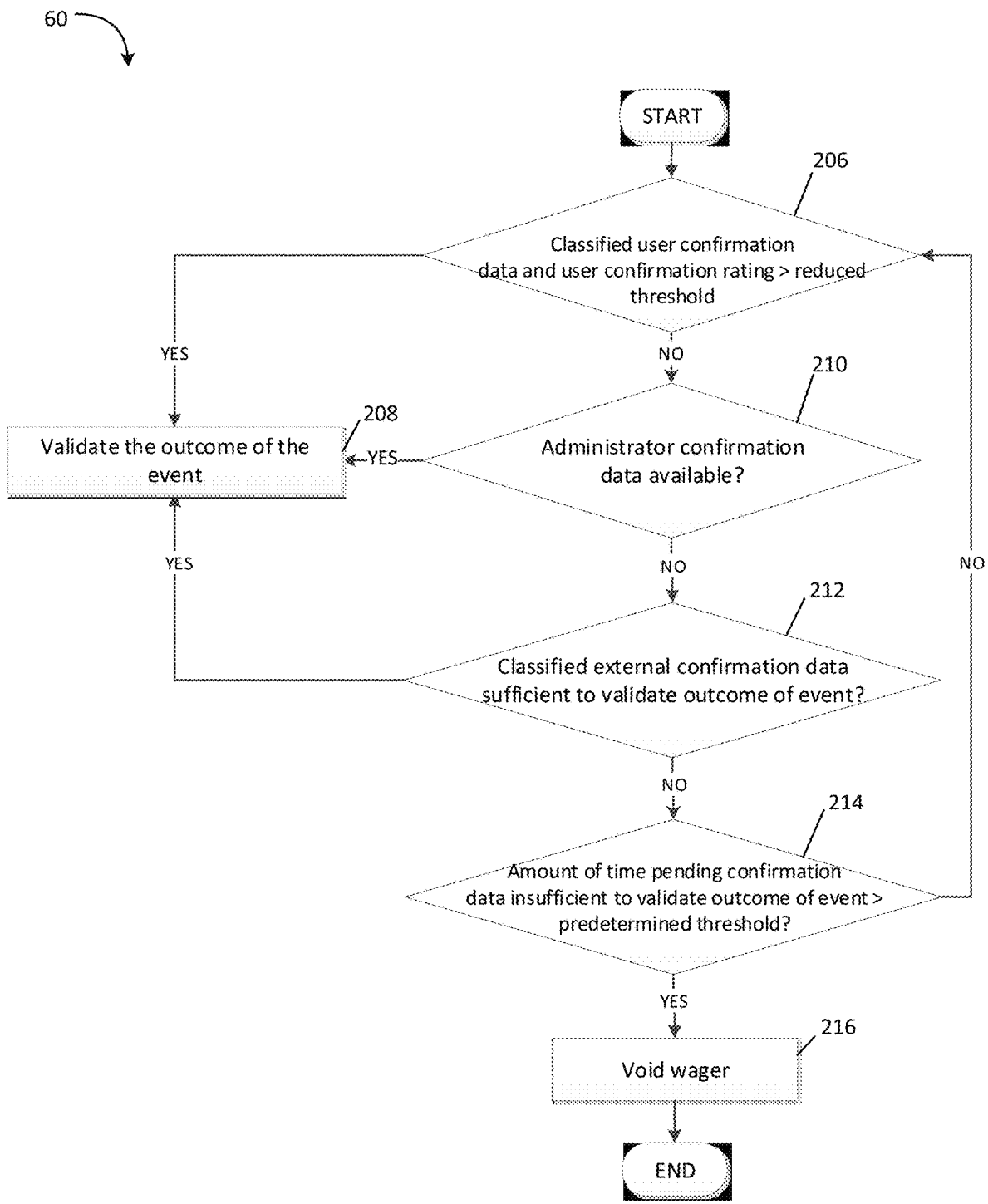
FIG. 8 is a flowchart illustrating step 60 of FIG. 2 in greater detail.

FIG. 8 is a flowchart illustrating step 60 of FIG. 2 in greater detail. In particular, FIG. 8 illustrates processing steps carried out by the system 10 to validate an outcome of an event. In step 206, the system 10 determines whether the classified user confirmation data and/or user confirmation ratings are greater than the reduced threshold as determined in step 184 of FIG. 7B. (e.g., the system 10 received and classified event outcome confirmation data from users with high confirmation ratings). If the system 10 determines that the classified user confirmation data and/or user confirmation ratings are greater than the reduced threshold, then the process step 208 and the system 10 validates an outcome of the event. Alternatively, if the system 10 determines that the classified user confirmation data and/or user confirmation ratings are less than the reduced threshold, then the process proceeds to step 210. For example, a wager between two users could fail to meet the reduced threshold if each user submits conflicting event outcome confirmation data thereby requiring additional event outcome confirmation data from at least one confirmation data source (e.g., an administrator or an external data source 24).

In step 210, a system administrator can review event outcome confirmation data and/or evidence (e.g., an outcome certification) submitted by each user or utilize other methods (e.g. observing the event outcome) to manually validate the outcome of the event. If the administrator 10 determines that the event outcome confirmation data and/or evidence is sufficient to satisfy the reduced threshold, then the process proceeds to step 208 and the system 10 validates an outcome of the event. Alternatively, if the administrator determines that the event outcome confirmation data and/or evidence is insufficient to satisfy the reduced threshold, then the process proceeds to step 212. In step 212, the system 10 determines whether classified external event outcome confirmation data (e.g. a paid data service, a social media user, etc.) and/or external data source confirmation ratings are sufficient to satisfy the reduced threshold. If the system 10 determines that the classified external event outcome confirmation data and/or external data source confirmation ratings are sufficient to satisfy the reduced threshold, then the process proceeds to step 208 and the system 10 validates an outcome of the event. Alternatively, if the system 10 determines that the classified external event outcome confirmation data and/or external data source confirmation ratings are insufficient to satisfy the reduced threshold, then the process proceeds to step 214. It should be understood that the system 10 can utilize classified user event outcome confirmation data and/or confirmation ratings; administrator confirmation inputs; and/or classified external event outcome confirmation data and/or external data source confirmation ratings individually or in conjunction with one other to validate an outcome of an event. The system 10 can validate an outcome of an event by utilizing at least one machine learning technique to accurately validate the outcome of an event. (e.g., user confirmation data for an event). For example, the system 10 can fit a correct sample size of user confirmation data with a sufficient level of projected accuracy based on user confirmation ratings to validate an outcome of an event.

In step 214, the system 10 monitors an amount of time that the event outcome is pending validation against a predetermined threshold (e.g., set by default or by an administrator) and determines whether the amount of time is greater than the predetermined threshold. The predetermined threshold can include, but is not limited to, a set amount of time such as a day, a week, a month, etc. or a variable amount of time based on a size of the event, a size of a pool, a number of players, an amount of dollars wagered, etc. For example, an administrator could decide that any event outcomes with insufficient event outcome confirmation data within 24 hours will fail to validate. If the system 10 determines that the amount of time is less than the predetermined threshold (e.g., there is time remaining to validate the outcome of the event), then the proceeds returns to step 206. Alternatively, if the system 10 determines that the amount of time is greater than the predetermined threshold (e.g., there is no time remaining to validate the outcome of the event), then the process proceeds to step 216. In step 216, the system 10 voids a wager due to insufficient event outcome confirmation data. To prevent bad actors (e.g., a user 12 who intentionally submits erroneous event outcome confirmation data to void a losing wager), the system 10 can decrease a confirmation rating of a user 12 such that other users would be less likely to wager with the user 12 until his/her confirmation rating improves.

It should be understood that a system administrator or host of an event can utilize one or more settings to adjust a level of certainty required by the system 10 to validate an event outcome. These settings include, but are not limited to, requiring a minimum number of users to confirm an event outcome with no disputes, requiring a percentage of statistical confidence and/or margin of error (e.g. 99%+/−0.1%), adjusting an amount of time allowed for event outcome confirmation data and/or confirmation data sources to be received, and relying on a single trusted confirmation data source or administrator to manually confirm an event outcome before validation. The system 10 can utilize at least one machine learning technique to automatically recommend and continually optimize validation processing to accurately validate an event outcome. The system 10 can further utilize regulatory requirements for specific jurisdictions during validation processing.

Figure 9A:
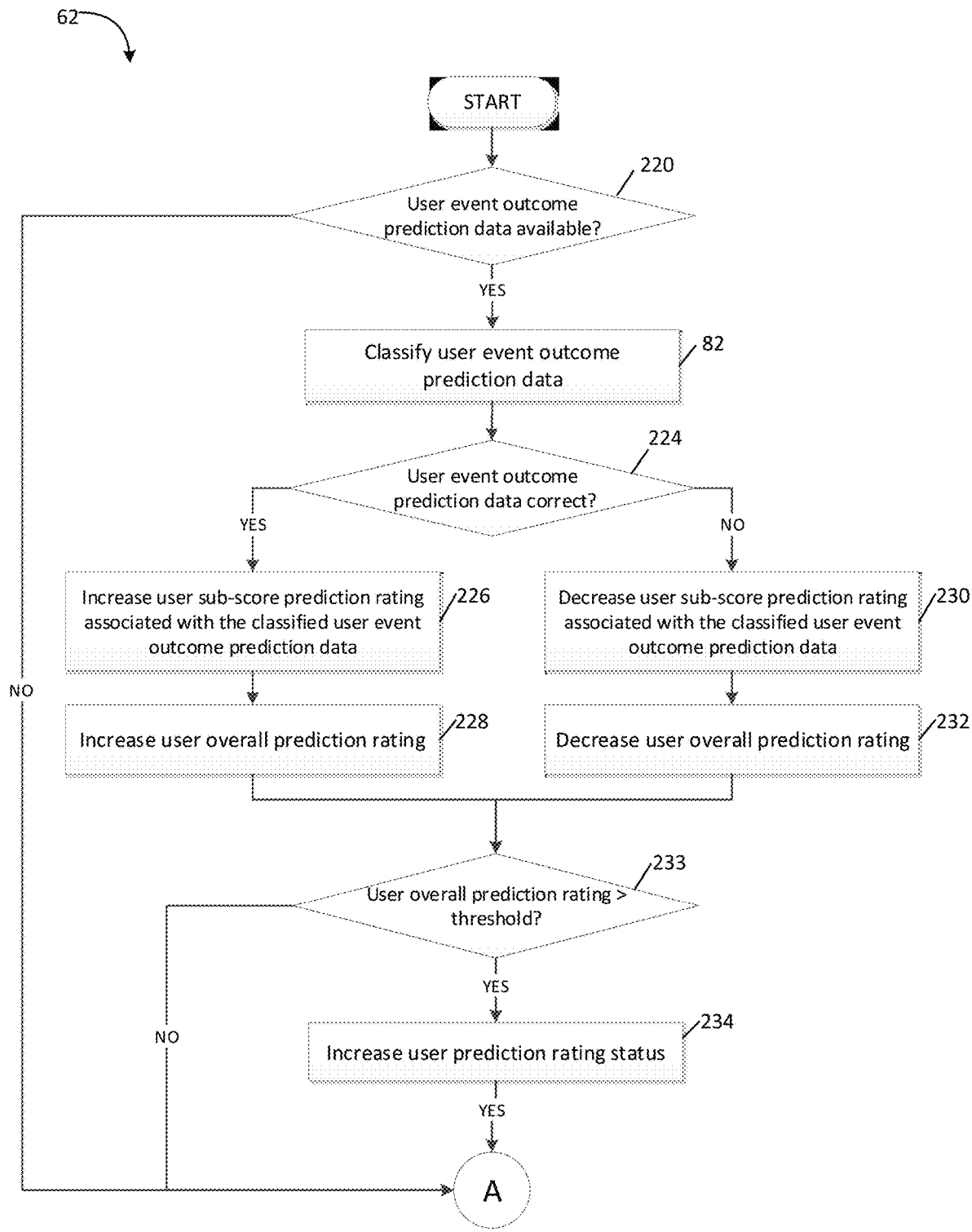
FIGS. 9A and 9B are flowcharts illustrating step 62 of FIG. 2 in greater detail.
Figure 9B:
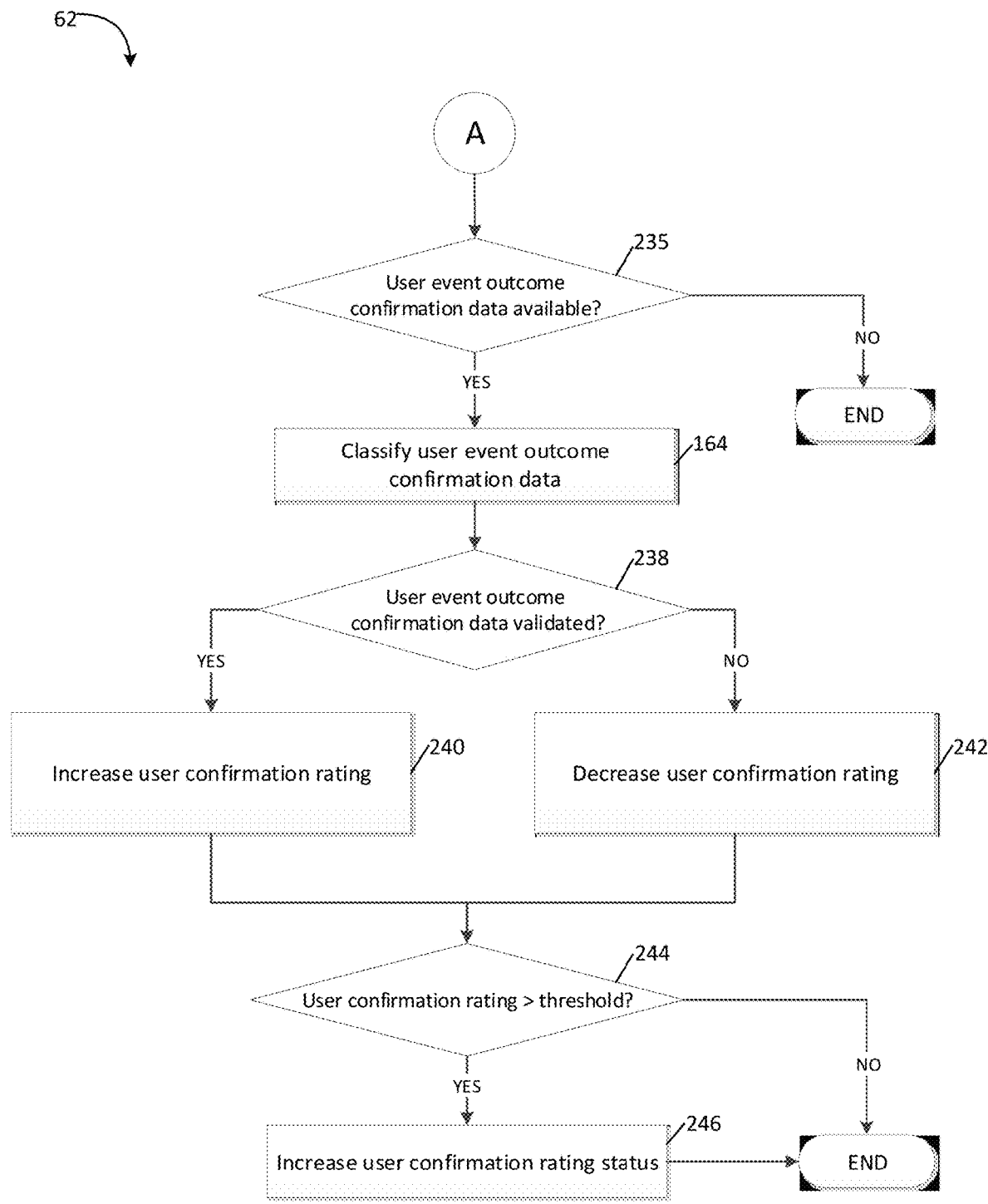

FIGS. 9A and 9B are flowcharts illustrating step 62 of FIG. 2 in greater detail. In particular, FIGS. 9A and 9B illustrate processing steps carried out by the system 10 for adjusting one or more of a user prediction rating and a user confirmation rating based on a confirmed and validated event outcome. In step 220, the system 10 determines whether user event outcome prediction data is available for a wager associated with an outcome of an event. As mentioned above, the system 10 can receive, from a user 12, event outcome prediction data indicative of an anticipated outcome of an event that the user 12 believes will occur and the user 12 can submit the event outcome prediction data with or without participating in a wager related to the outcome of the event. It should be understood that the system 10 can utilize user wager input data as prediction data. If the user event outcome prediction data is available (e.g., a user 12 wagered on an outcome of an event or submitted event outcome prediction data without wagering on the outcome of the event), then the process proceeds to step 82. Alternatively if the user event outcome prediction data is not available (e.g., a user 12 did not wager on an outcome of an event and did not submit event outcome prediction data associated with the outcome of the event), then the process proceeds to step A.

In step 82, the system 10 classifies the user event outcome prediction data as mentioned above in relation to FIGS. 4A and 4B. It should be understood that the classification can be applied to an adjustment (e.g., an increase or decrease) of a user's prediction and wagering ratings. For example, correctly predicting a longshot winner may affect a prediction rating more than correctly predicting a heavy favorite. In step 224, the system 10 determines whether the user event outcome prediction data is correct. In particular, the system 10 determines whether the user event outcome prediction data corresponds to the validated event outcome associated with the user event outcome prediction data. If the system 10 determines that the user event outcome prediction data corresponds to the validated event outcome, then the process proceeds to step 226. In step 226, the system 10 increases a user sub-score prediction rating associated with the classified user event outcome prediction data. Then, in step 228, the system 10 increases a user overall prediction rating. It should be understood that a user prediction rating can include an overall prediction score indicative of an accuracy of predictions made by a respective user 12. Additionally, the user overall prediction rating score can include a plurality of sub-scores associated with respective types of events. For example, a user 12 such as a baseball journalist can have a high overall prediction rating based in part on having a high sub-score associated with wagers related to baseball. In this way, the system 10 can provide a baseline confidence level for each user overall prediction rating such that users of the system 10 (e.g., the Social Betwork™) can view and identify users that are skilled and/or knowledgeable with respect to one or more types of events. Further, the system 10 can utilize machine learning to identify skilled and/or knowledgeable users and prompt these users, via a graphical user interface, to submit event outcome prediction data associated with events within their respective areas of expertise. The process then proceeds to step 233.

Alternatively, if the system 10 determines that the user event outcome prediction data does not correspond to the validated event outcome, then the process proceeds to step 230. In step 230, the system 10 decreases a user sub-score prediction rating associated with the classified user event outcome prediction data. Then, in step 232, the system 10 decreases a user overall prediction rating. A decrease in a user's overall prediction rating can incentivize a user 12 to predict correctly to prevent his/her overall prediction rating from decreasing and to prevent being viewed as less reliable by the system 10 and users of the system 10 (e.g., the Social Betwork™). It should be understood that if a user does not have a prediction rating, the system 10 can assign the user a prediction rating based on a first prediction of the user. The process then proceeds to step 233.

In step 233, the system 10 determines whether a user overall prediction rating (e.g., an increased or decreased user overall prediction rating) is greater than a threshold. The system 10 or a system administrator could determine the threshold. If the user overall prediction rating is greater than the threshold, then the process proceeds to step 234 and, in step 234, the system 10 increases a prediction rating status of a user 12. As a user 12 participates in the prediction process, the user 12 can earn increasingly higher statuses indicative of increasingly higher levels of prediction reliability which provides for the user 12 to be viewed as more reliable by the system 10 and users of the system 10 (e.g., the Social Betwork™). This encourages good behavior because realizing increasingly higher statuses can incentivize a user 12 to predict correctly. For example, a higher status can unlock particular privileges within the system 10 including, but not limited to, an ability to submit a recommendation to the system 10 for a future wager or to suggest a wager to another user. Alternatively, if the user overall prediction rating is less than the threshold, then the process proceeds to step A. The system 10 can utilize at least one machine learning algorithm to continuously optimize the processing steps described above based on additional data received from a user 12, an external data source 24, and machine learning techniques (e.g., backpropagation).

From step A, the process proceeds to step 235. In step 235, the system 10 determines whether user event outcome confirmation data is available for a wager associated with an outcome of an event. As mentioned above, the system 10 can receive, from a user 12, event outcome confirmation data indicative of an outcome of an event and the user 12 can submit the event outcome confirmation data with or without participating in a wager related to the outcome of the event. If the user event outcome confirmation data is available (e.g., the user 12 submitted event outcome prediction data and event outcome confirmation data associated with an outcome of an event or the user 12 submitted event outcome confirmation data without submitting event outcome prediction data), then the process proceeds to step 164. Alternatively, if the user event outcome confirmation data is not available (e.g., the user 12 did not submit event outcome confirmation data), then the process ends.

In step 164, the system 10 classifies the event outcome confirmation data as mentioned above in relation to FIGS. 6 and 7A. For example, the system 10 can classify event outcome confirmation data related to a lesser-known event (e.g., Cooper's Hill Cheese-Rolling) having a smaller sample size and less availability of data more heavily that a well-known event (e.g., the Super Bowl) having a larger sample size and greater availability of data. It should be understood that the classification can be applied to an adjustment (e.g., an increase or decrease) of a user's confirmation and wagering ratings. For example, correctly confirming an outcome of a lesser-known event (e.g., Cooper's Hill Cheese-Rolling) can improve a confirmation rating of a user 12 more than correctly confirming an outcome of a well-known event (e.g., the Super Bowl).

In step 238, the system 10 determines whether the user event outcome confirmation data is validated. In particular, the system 10 determines whether the user event outcome confirmation data has been validated as mentioned above in relation to FIG. 8. If the system 10 determines that the user event outcome confirmation data has been validated, then the process proceeds to step 240. In step 240, the system 10 increases a user confirmation rating. For example, the system 10 can increase a user confirmation rating based on a numerical value associated with the classified confirmation data. The process then proceeds to step 244. Alternatively, if the system 10 determines that the user event outcome confirmation data has not been validated, then the process proceeds to step 242. In step 242, the system 10 decreases a user confirmation rating. For example, the system 10 can decrease a user confirmation rating based on a numerical value associated with the classified confirmation data. The process then proceeds to step 244.

In step 244, the system 10 determines whether a user confirmation rating is greater than a threshold. If the system 10 determines that the user confirmation rating is greater than the threshold, then the process proceeds to step 246 and, in step 246, the system 10 increases a confirmation rating status of a user 12. As a user 12 participates in the confirmation process, the user 12 can earn increasingly higher statuses indicative of increasingly higher levels of confirmation reliability which provides for the user 12 to be viewed as more reliable by the system 10 and users of the system 10 (e.g., the Social Betwork™). For example, the system 10 can increase a confirmation status of user 12 to "Trusted User" if the system 10 determines that the user confirmation rating exceeds a predetermined accuracy percentage threshold. This encourages good behavior because realizing increasingly higher statuses can incentivize a user 12 to submit correct confirmation data. For example, a higher status can unlock particular privileges within the system 10 and/or the system 10 can provide virtual or real prizes and/or publicity for a user 12 that submits the most and/or quickest correct confirmation data. Alternatively, if the user confirmation rating is less than the threshold, then the process ends.

It should be understood that the system 10 can decrease a confirmation rating status of a user 12 if the user confirmation rating is less than the threshold or assign a confirmation rating to the user 12 based on a first confirmation data submission if the user 12 does not have a confirmation rating. It should also be understood that the processing steps described above for FIGS. 9A and 9B are also applicable to an external data source 24 to determine an external data source 24 prediction and/or confirmation rating. The system 10 can utilize at least one machine learning algorithm to continuously optimize the processing steps described above based on additional data received from a user 12, an external data source 24, and machine learning techniques (e.g., backpropagation).

Figure 10:
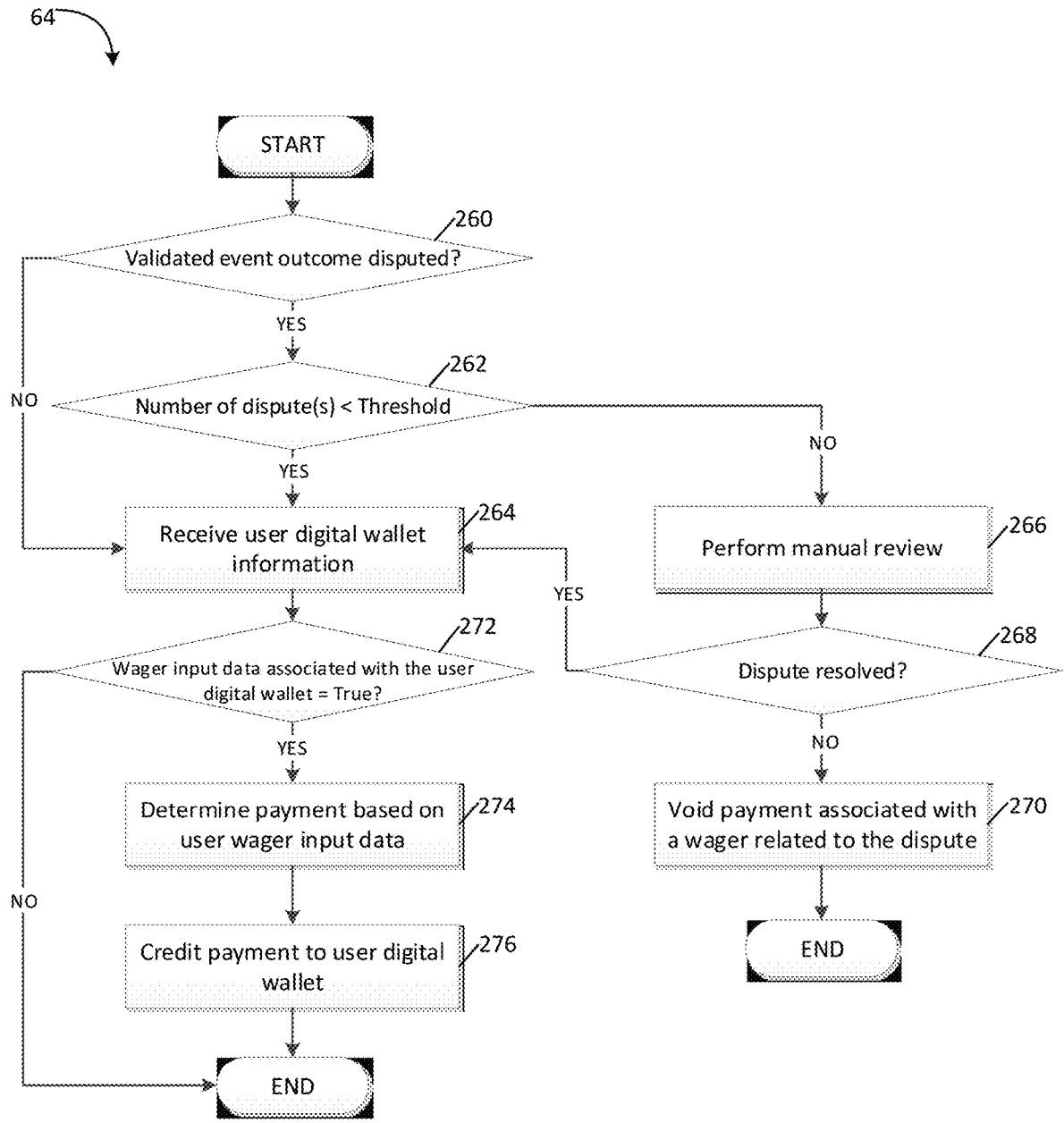
FIG. 10 is a flowchart illustrating step 64 of FIG. 2 in greater detail.

FIG. 10 is a flowchart illustrating step 64 of FIG. 2 in greater detail. In particular, FIG. 10 illustrates processing steps carried out by the system 10 to process a payment associated with a wager related to an outcome of an event. In step 260, the system 10 determines whether a validated outcome of an event is disputed. If the system 10 determines that a validated outcome of an event is disputed, then the process proceeds to step 262. Alternatively, if the system 10 determines that a validated outcome of an event is not disputed, then the process proceeds to step 264. In step 262, the system 10 determines whether a number of disputes contesting a validated outcome of an event is less than a threshold. If the system 10 determines that a number of disputes contesting a validated outcome of an event is less than a threshold, then the process proceeds to step 264. Alternatively, if the system 10 determines that a number of disputes contesting a validated outcome of an event is greater than a threshold, then the process proceeds to step 266.

As described below in reference to steps 266-270, the system 10 provides for a review and dispute resolution process after an event outcome is validated but before a payment associated with a wager related to an event outcome is processed. In this way, the system 10 provides a safeguard against a user 12 or a group of users 16 intentionally disputing a validated outcome to skew and/or nullify a validated event outcome by the system 10. In step 266, an administrator of the system 10 can perform a manual review of a dispute or disputes contesting a validated outcome of an event. For example, an administrator can review each dispute for relevance and/or accuracy and any evidence submitted by a user 12 disputing a validated outcome of an event. Evidence can include, but is not limited to, a certification of the outcome of an event, photo/video capture of the outcome of the event, and evidence of fraud and/or unfair competition such as collusion. In step 268, the system 10 determines whether a dispute is resolved. If the system 10 determines that a dispute is resolved, then the process returns to step 264.

Alternatively, if the system 10 determines that a dispute is not resolved, then the process proceeds to step 270. In step 270, the system 10 voids a payment associated with a wager related to the disputed validated event outcome. It should be understood that voiding a wager payment can result in negative consequences for a user 12 disputing a validated outcome in bad faith. For example, to prevent a bad actor (e.g., a user 12 who intentionally disputes a validated outcome to void a losing wager), the system 10 can decrease a confirmation rating of a user 12 such that other users would be less likely to wager with the user 12 until his/her confirmation rating improves.

In step 264, the system 10 receives digital wallet information of a user 12. Alternatively, the system 10 can store digital wallet information of a user 12 from which the user 12 can deposit or withdraw funds. Additionally, each time a user 12 places a wager, the system 10 can process the digital wallet information of the user 12 to reduce an amount of funds from the digital wallet associated with the wager. Then, in step 272, the system 10 determines whether wager input data associated with the digital wallet information is true. In particular, the system 10 determines whether the user 12 has won his/her wager. If the system 10 determines that the wager input data associated with the digital wallet information is true (e.g., a user 12 has won his/her wager), then the process proceeds to step 274. Alternatively, if the system 10 determines that the wager input data associated with the digital wallet information is not true (e.g., a user 12 has lost his/her wager), then the process ends. In step 274, the system 10 determines a wager payment owed to a user 12 based on the user wager input data. Lastly, in step 276, the system 10 credits a wager payment to a digital wallet of a user 12. It should be understood that this wager payment need not be automatic. For example, a user 12 could manually settle a wager outside of the system 10 using a third party payment processor (e.g., Venmo). The system 10 can track and maintain financial records necessary to meet tax and regulatory requirements in a relevant jurisdiction and can execute transactions in traditional and blockchain cryptocurrencies as appropriate.

As a user 12 participates in the payment process, the user 12 can earn increasingly higher payment ratings and/or statuses, indicative of increasingly higher levels of wager payment integrity, based on a threshold of correctly processed payments. In this way, the system 10 provides for the user 12 to be viewed as more reliable by the system 10 and users of the system 10 (e.g., the Social Betwork™). This encourages good behavior because realizing increasingly higher payment ratings and/or statuses can incentivize a user 12 to pay correctly when using a third party payment processor (e.g., Venmo) and to dispute validated event outcomes in good faith. Additionally, the system 10 can leverage user payment ratings and/or statuses to identify potential fraudulent transactions or other anomalies.

Figure 11:
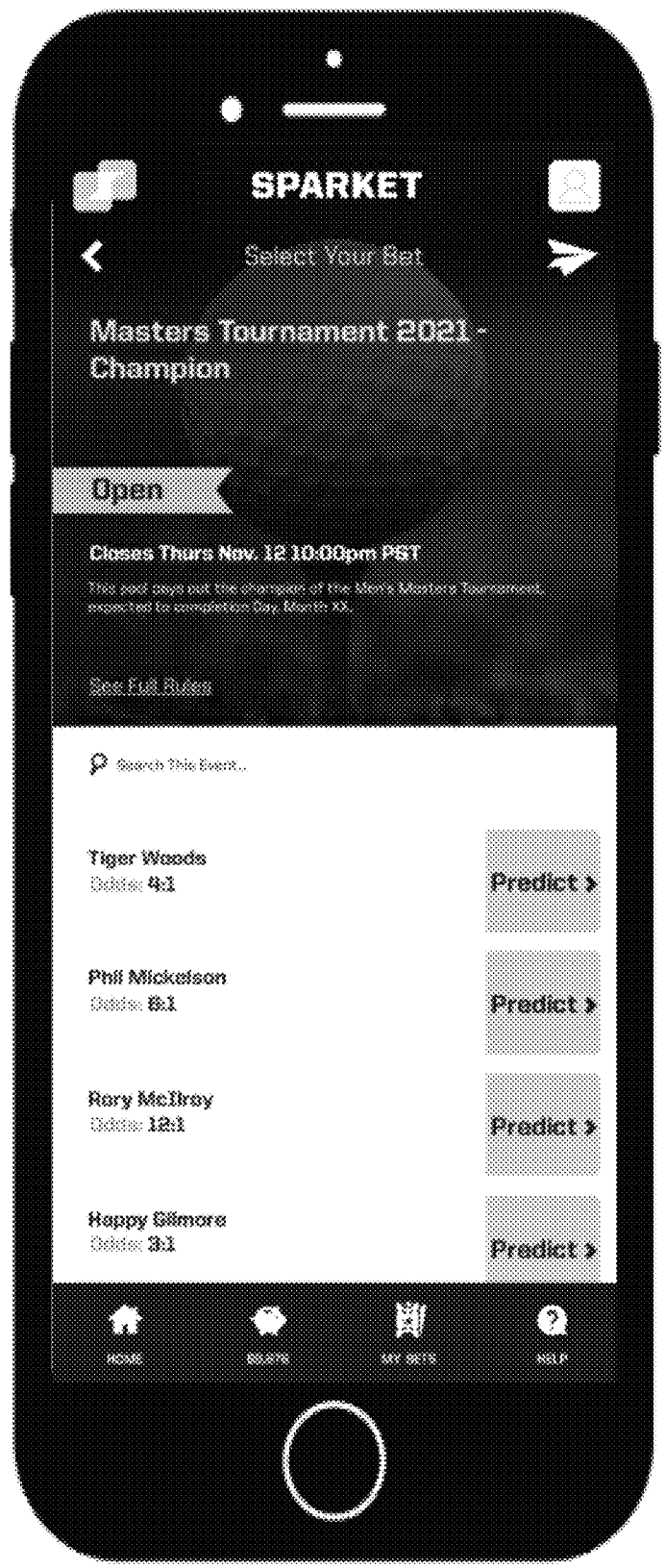
FIGS. 11-18 are screenshots of a graphical user interface of the system of the present disclosure illustrating respective operations thereof.
Figure 12:
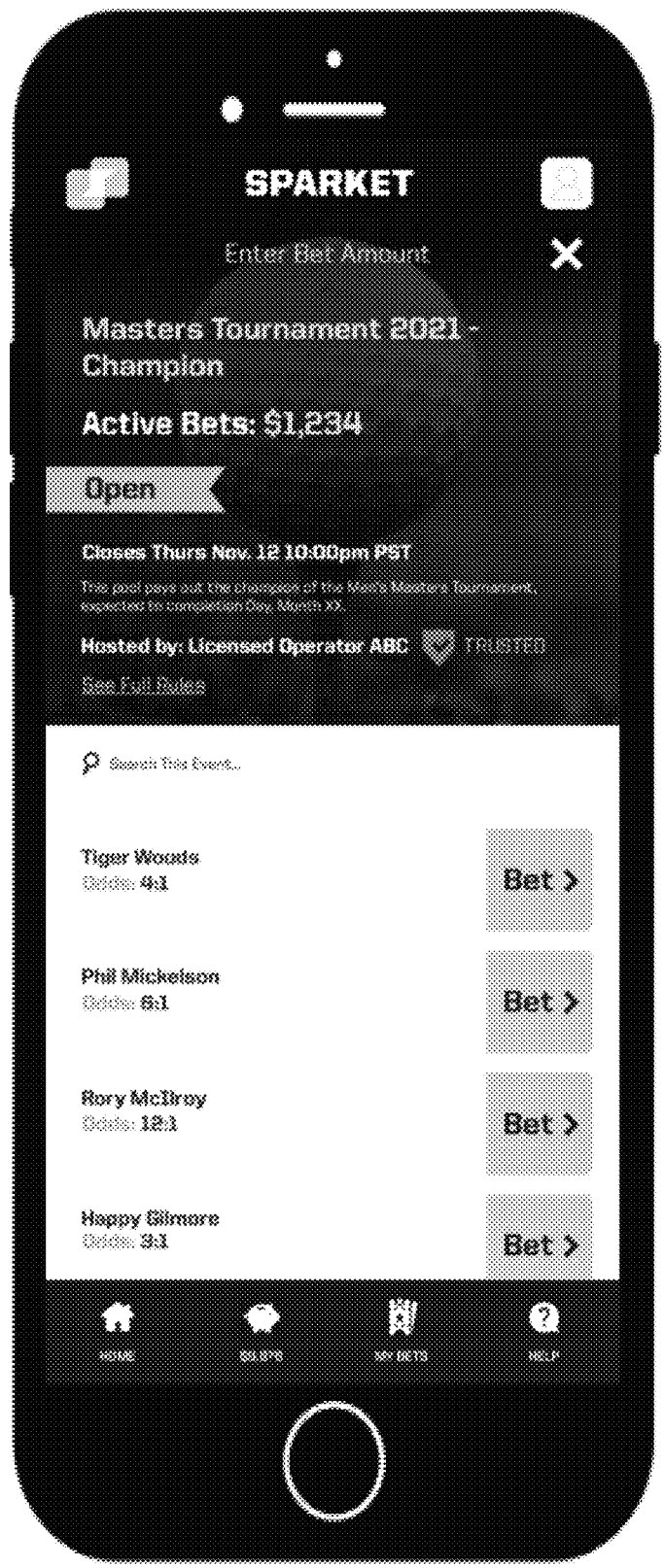
Figure 13:
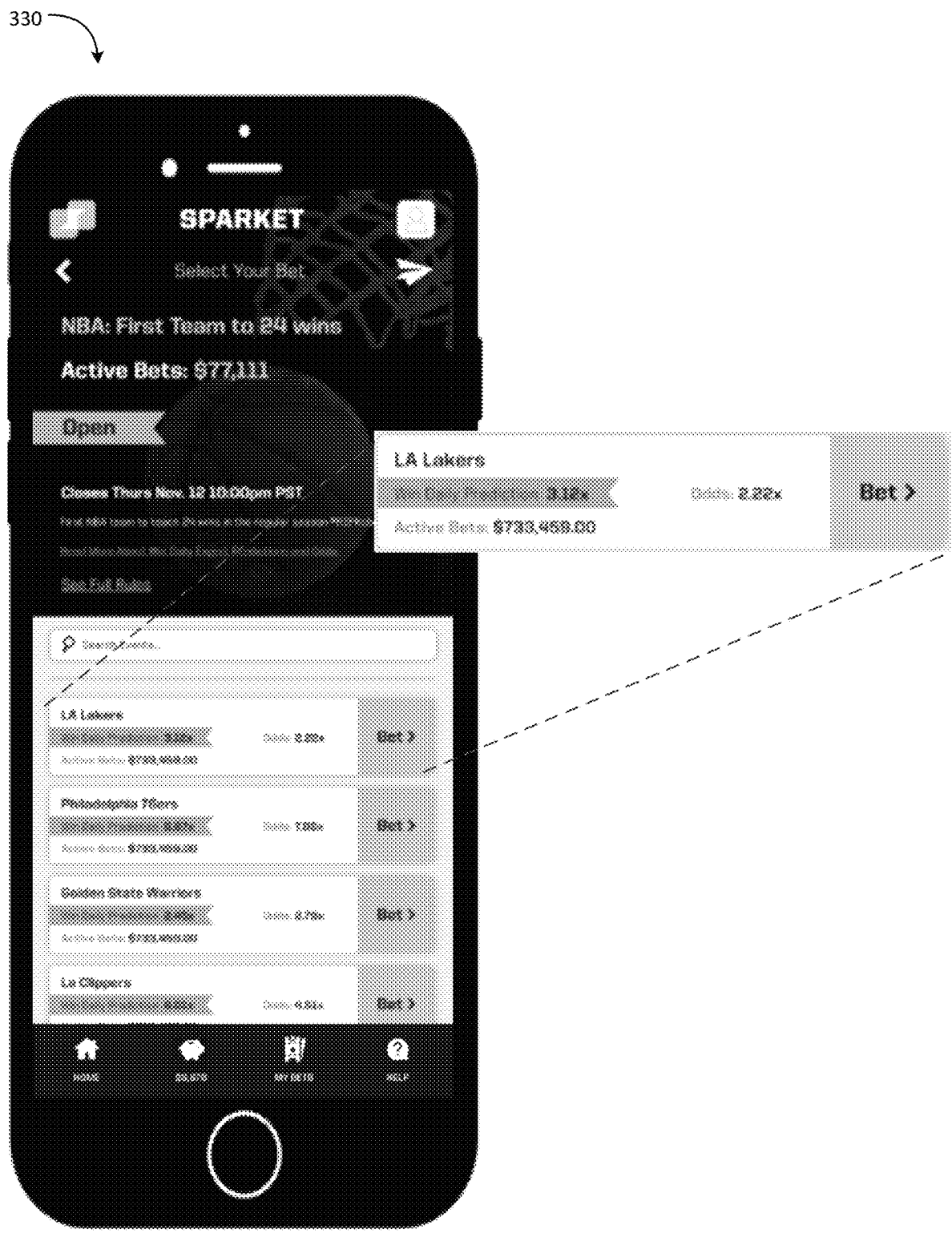
Figure 14:
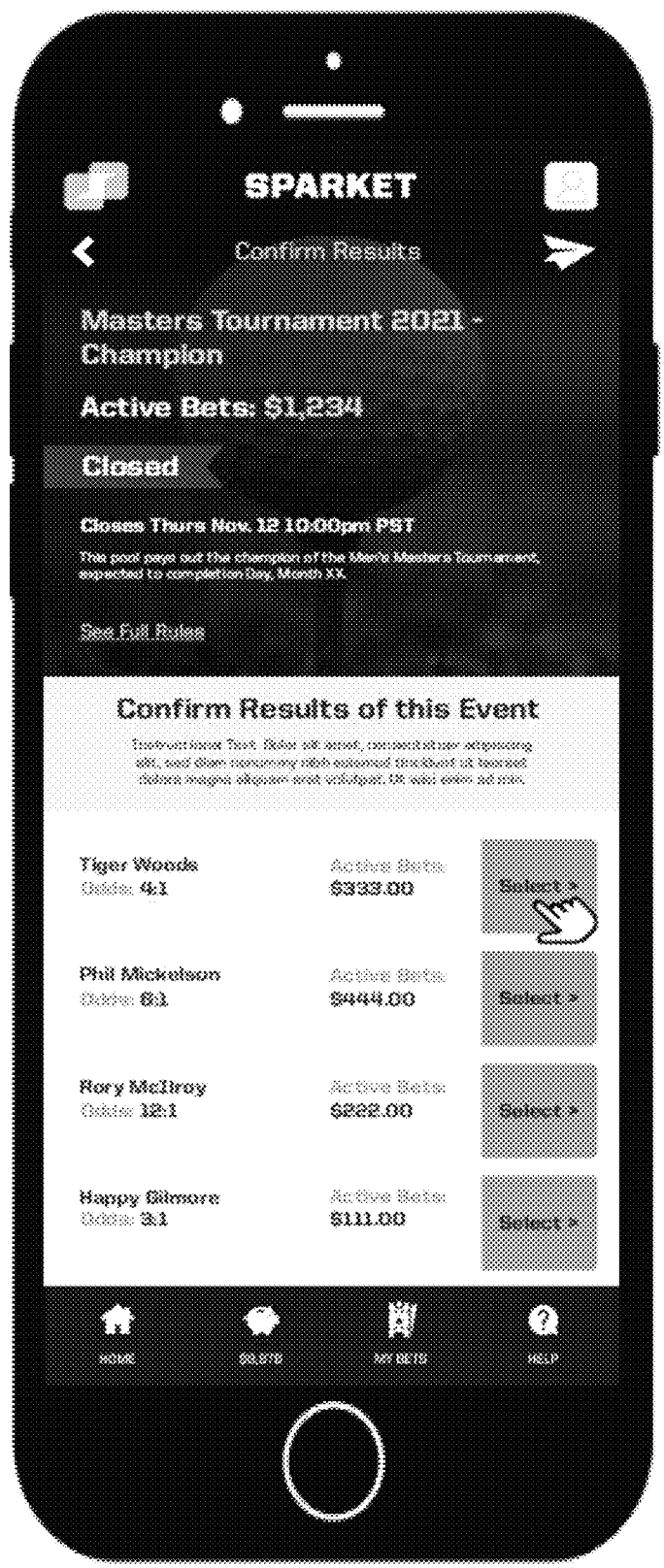
Figure 15:
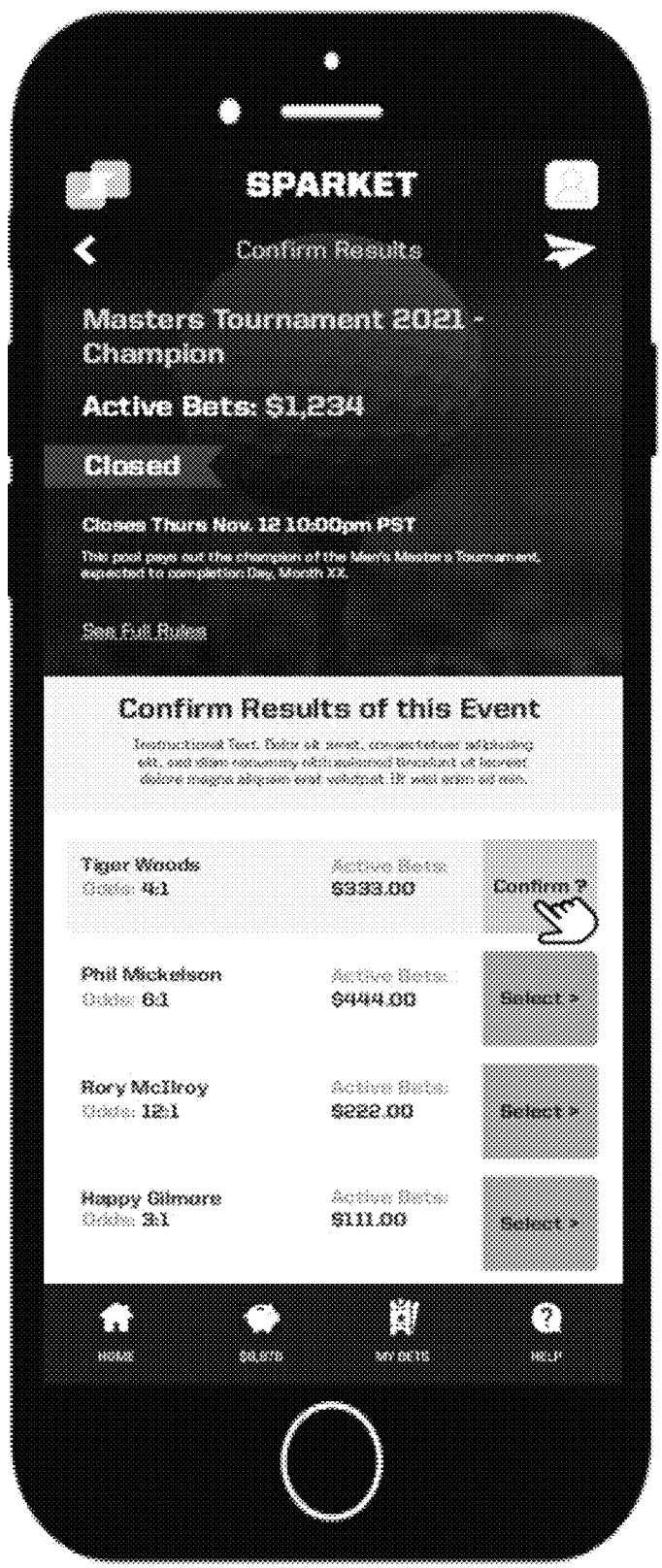
Figure 16:
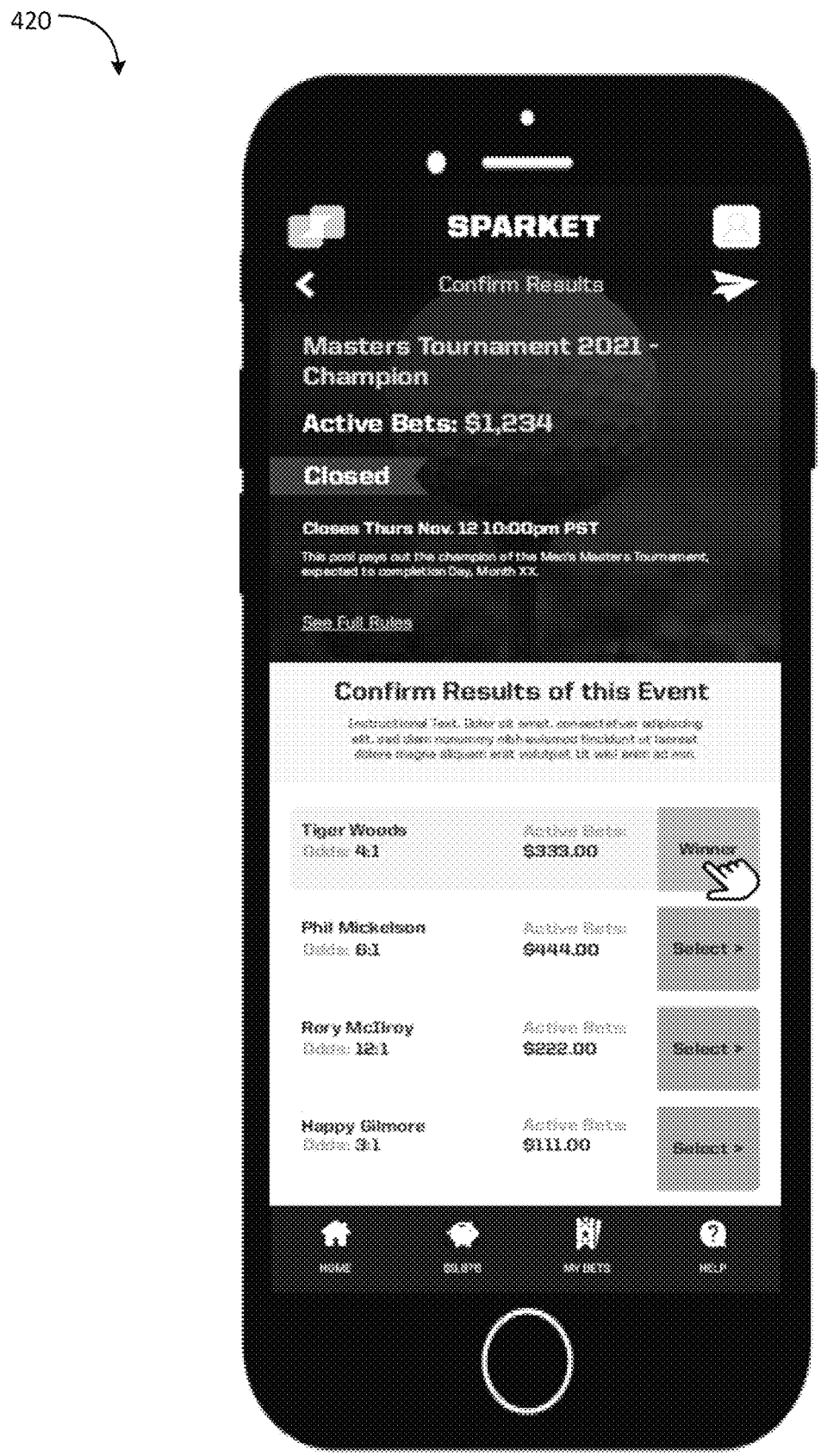
Figure 17:
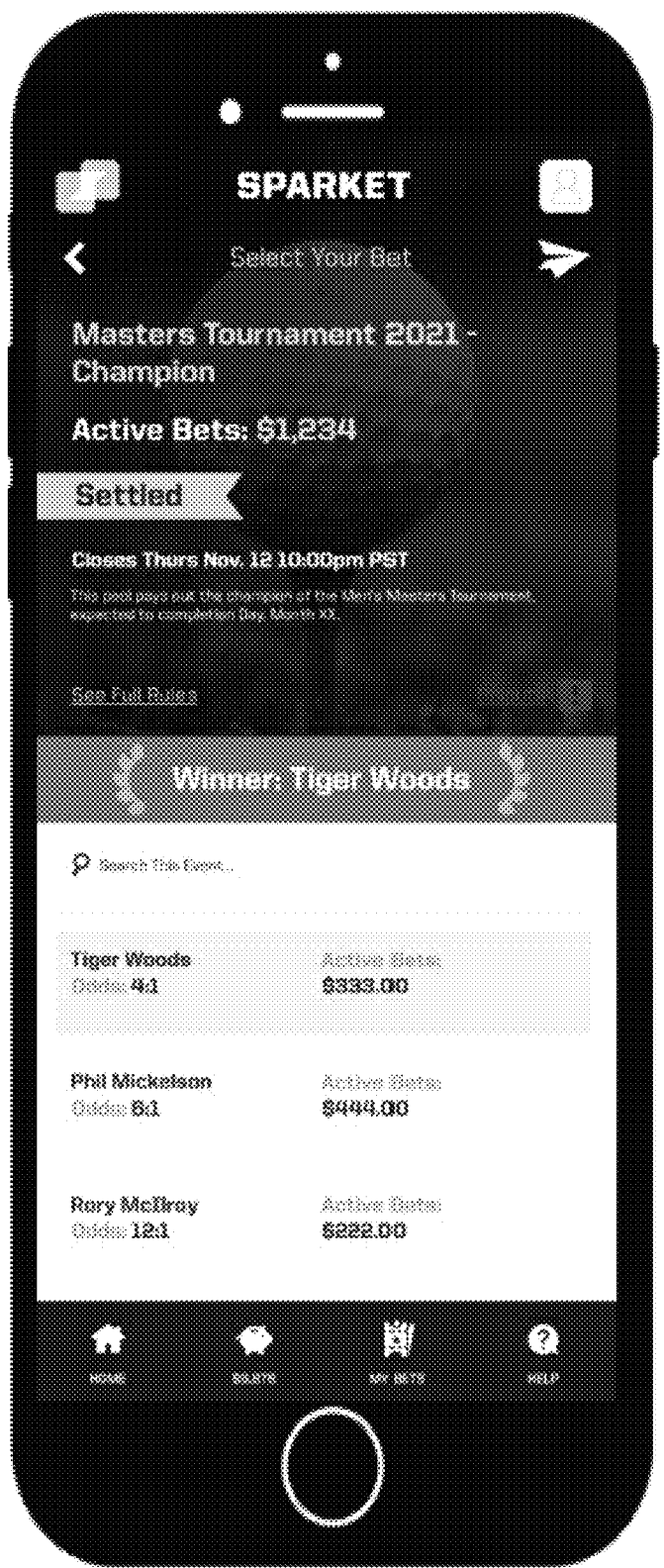
Figure 18:
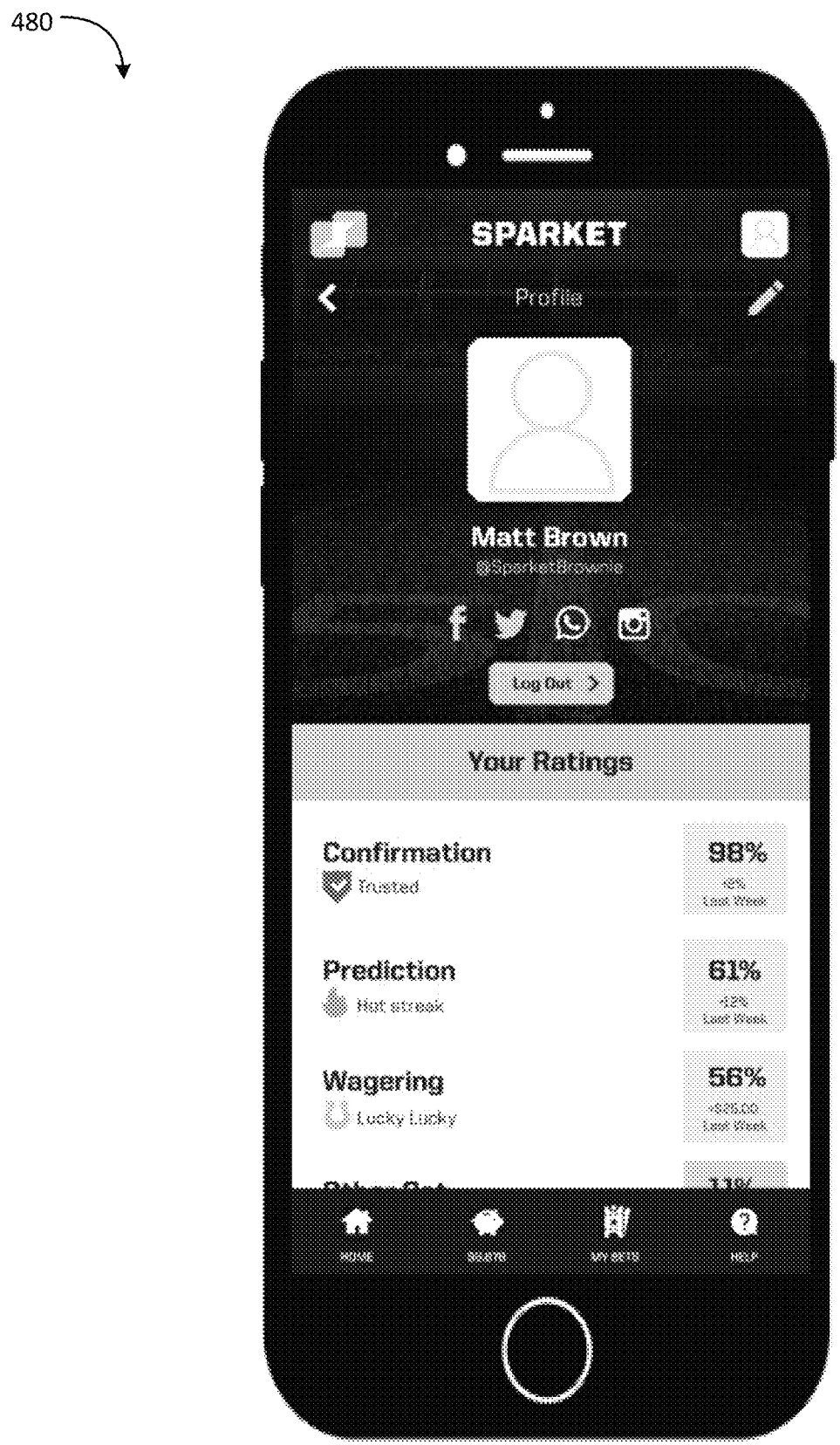

FIGS. 11-18 are screenshots of a graphical user interface (GUI) of the system 10 illustrating respective operations thereof. In particular, FIG. 11 is a screenshot 300 of a GUI generated by the system 10 and displayed on a mobile device illustrating steps 52 and 54 as described above in relation to FIGS. 2-4A. FIG. 12 is a screenshot 320 of a GUI generated by the system 10 and displayed on a mobile device illustrating step 56 as described above in relation to FIGS. 2 and 5. FIG. 13 is a screenshot 330 of a GUI generated by the system 10 and displayed on a mobile device illustrating the display of predicted and real odds as described above in relation to FIG. 5. FIGS. 14-16 are screenshots 360, 390 and 420 of a GUI generated by the system 10 and displayed on a mobile device illustrating step 58 as described above in relation to FIGS. 2 and 6. FIG. 17 is a screenshot 450 of a GUI generated by the system 10 and displayed on a mobile device illustrating steps 60 and 64 as described above in relation to FIGS. 2 and 10. Lastly, FIG. 18 is a screenshot 480 of a GUI generated by the system 10 and displayed on a mobile device illustrating step 62 as described above in relation to FIGS. 2 and 9.

Figure 19:
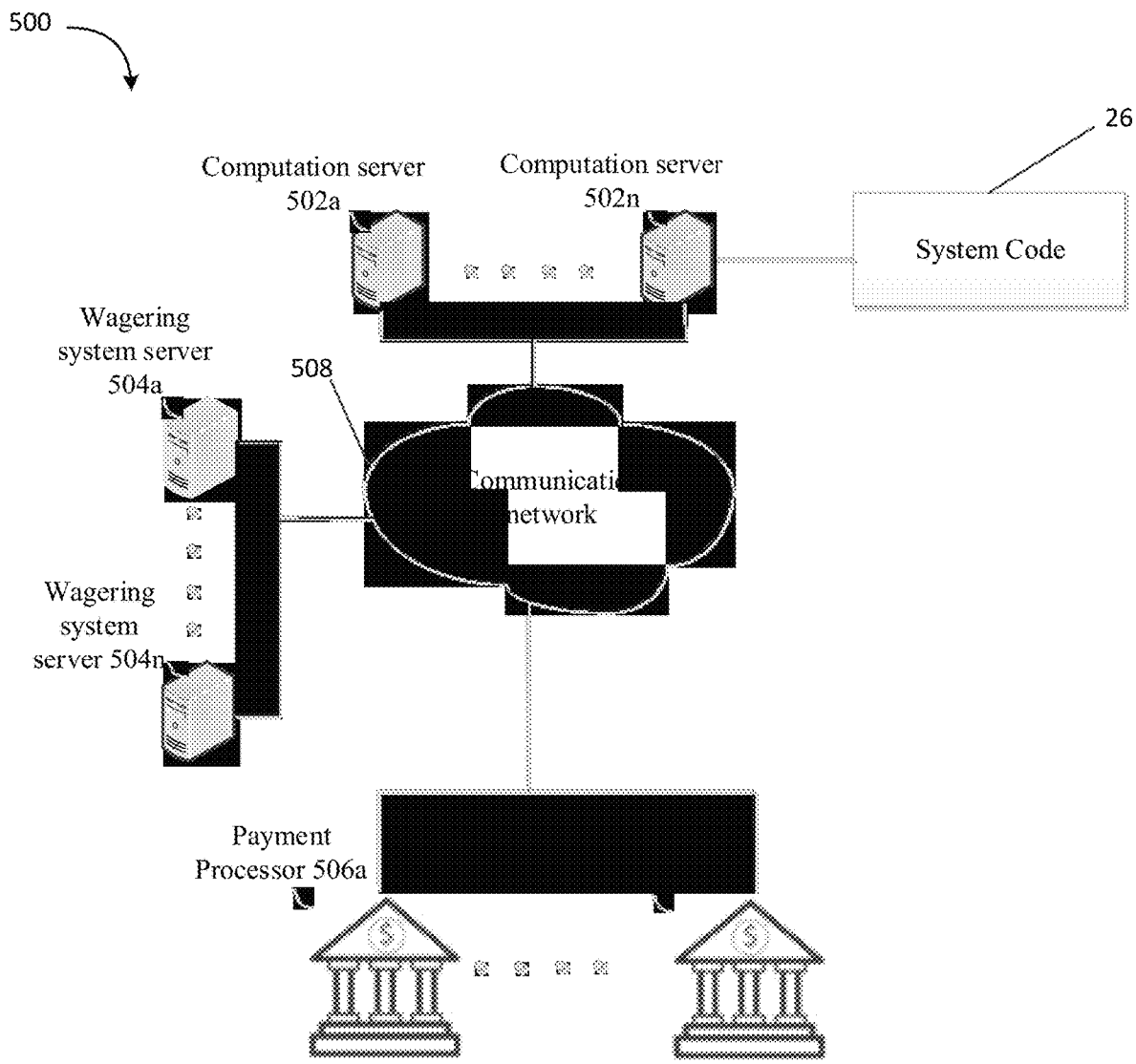
FIG. 19 is a diagram illustrating another embodiment of the system of the present disclosure.

FIG. 19 is a diagram 500 illustrating another embodiment of the system of the present disclosure. In particular, FIG. 15 illustrates computer hardware and network components on which the system could be implemented. The system can include a plurality of computation servers 502a-502n having at least one processor and memory for executing the computer instructions and methods described above (which could be embodied as system code 26). The system can also include a plurality of wagering system servers 504a-504n. The system can also include a plurality of payment processors 506a-506n for processing payments. The computation servers 502a-502n, the wagering system servers 504a-504n, and the payment processors 506a-506n can communicate over a communication network 508 and one or more APIs (not shown). Of course, the system need not be implemented on multiple devices, and indeed, the system could be implemented on a single computer system (e.g., a personal computer, server, mobile computer, smart phone, etc.) without departing from the spirit or scope of the present disclosure.

Figure 20:
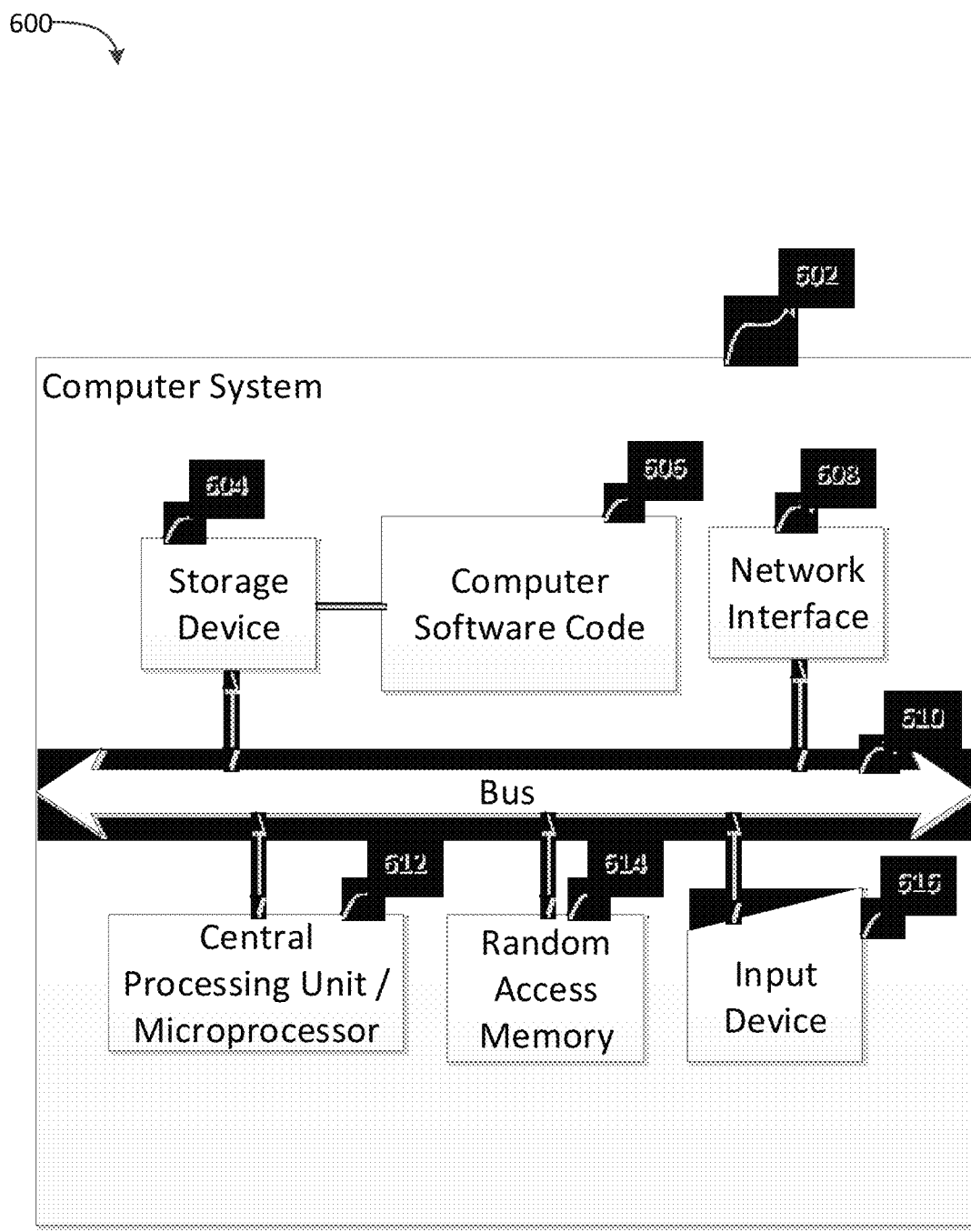
FIG. 20 is diagram illustrating another embodiment of the system of the present disclosure.

FIG. 20 is diagram 600 illustrating another embodiment of the system of the present disclosure. In particular FIG. 16 illustrates hardware and software components of a computer system 602 on which the system of the present disclosure can be implemented. The computer system 602 can include a storage device 604, computer software code 606, a network interface 608, a communications bus 610, a central processing unit (CPU) (microprocessor) 612, a random access memory (RAM) 614, and one or more input devices 616, such as a keyboard, mouse, etc. It is noted that the CPU 612 could also be one or more graphics processing units (GPUs). The computer system 602 could also include a display (e.g., liquid crystal display (LCD), cathode ray tube (CRT), etc.). The storage device 604 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The computer system 602 could be a networked computer system, a personal computer, a server, a smart phone, tablet computer, wagering kiosk, etc. It is noted that the server need not be a networked server, and indeed, could be a stand-alone computer system.

The functionality provided by the present disclosure could be provided by computer software code 606, which could be embodied as computer-readable program code stored on the storage device 604 and executed by the CPU 612 using any suitable, high or low level computing language, such as Python, Java, C, C++, C#, .NET, MATLAB, Golang, J S React, etc. The network interface 608 could include an Ethernet network interface device, a wireless network interface device, or any other suitable device which permits the server 602 to communicate via the network. The CPU 612 could include any suitable single-core or multiple-core microprocessor of any suitable architecture that is capable of implementing and running the computer software code 606 (e.g., Intel processor). The random access memory 614 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It should be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for event outcome validation comprising:
a memory; and
a processor in communication with the memory, the processor:
receiving a user input indicative of an event and at least one anticipated outcome of the event to be wagered on by the user,
receiving confirmation data associated with an outcome of the event from at least one confirmation data source confirming the outcome of the event,
classifying the confirmation data utilizing at least one machine learning algorithm to determine an accuracy of the confirmation data,
determining a threshold of confirmation data sources to validate the outcome of the event,
utilizing the at least one machine learning algorithm to determine a reduced threshold of confirmation data sources to validate the outcome of the event based on at least one of the classified confirmation data and a confirmation rating of the at least one confirmation data source, the confirmation rating being indicative of a historical accuracy of confirmation data received from the at least one confirmation data source, and
automatically validating the outcome of the event based on the reduced threshold,
wherein the processor:
receives prediction data associated with the anticipated outcome of the event from at least one prediction data source,
classifies the prediction data utilizing the at least one machine learning algorithm in association with the anticipated outcome of the event to determine an accuracy of the prediction data, and
determines a prediction rating of the at least one prediction data source, the prediction rating being indicative of a historical accuracy of the prediction data received from the at least one prediction data source, and
wherein the processor adjusts the prediction rating of the at least one prediction data source based on the classified prediction data by:
determining whether the received prediction data is correct based on the validated outcome of the event,
increasing the prediction rating of the at least one prediction data source when the prediction data is validated, and
decreasing the prediction rating of the at least one prediction data source when the user prediction data is not validated.

2. The system of claim 1, wherein the processor:
   determines, based on the user input, whether the event is available to be wagered on by the user,
   generates the event, based on the user input, when the event is unavailable to be wagered on by the user,
   updates the event, based on the user input, when the event is available to be wagered on by the user, and
   selects the generated or updated event.

3. The system of claim 1, wherein the processor classifies the confirmation data utilizing the at least one machine learning algorithm to determine the accuracy of the confirmation data by:
   filtering the confirmation data into event types,
   categorizing the filtered confirmation data based on a plurality of variables,
   ranking the categorized confirmation data, and
   storing the ranked confirmation data.

4. The system of claim 1, wherein the processor;
   determines a population size associated with the outcome of the event,
   determines the threshold of confirmation data sources to validate the outcome of the event based on the population size and a first plurality of variables, and
   utilizes the at least one machine learning algorithm to determine the reduced threshold of confirmation data sources to validate the outcome of the event by scaling for the population size and a second plurality of variables based on at least one of the classified confirmation data and the confirmation rating.

5. The system of claim 1, wherein the processor classifies the prediction data utilizing the at least one machine learning algorithm in association with the anticipated outcome of the event to determine the accuracy of the prediction data by:
   filtering the prediction data into event types,
   categorizing the filtered prediction data based on a plurality of variables,
   ranking the categorized prediction data, and
   storing the ranked prediction data.

6. The system of claim 1, wherein the processor determines and displays odds associated with the anticipated outcome of the event by:
   receiving a user input indicative of wager data for the anticipated outcome of the event,
   determining whether a received volume of wager data for the event is greater than a first predetermined threshold, and
   displaying real odds associated with the anticipated outcome of the event when the received volume of wager data for the event is greater than the first predetermined threshold.

7. The system of claim 1, wherein the processor determines and displays predicted odds associated with the anticipated outcome of the event by:
   determining whether at least one of the classified prediction data and the prediction rating of the at least one prediction data source is greater than a predetermined threshold, and
   displaying the predicted odds associated with the anticipated outcome of the event when at least one of the classified prediction data and the prediction rating of the at least one prediction data source is greater than the predetermined threshold,
   wherein the predicted odds are indicative of data sourced internally within the system.

8. The system of claim 1, wherein the processor determines and displays projected odds associated with the anticipated outcome of the event by:
   determining whether at least one of the classified prediction data and the prediction rating of the at least one prediction data source is greater than a predetermined threshold, and
   displaying the projected odds associated with the anticipated outcome of the event when at least one of the classified prediction data and the prediction rating of the at least one prediction data source is greater than the predetermined threshold, wherein the projected odds are indicative of data initially sourced externally to the system.

9. The system of claim 1, wherein the processor identifies and displays at least one of a wager buying opportunity and a wager selling opportunity by utilizing the classified prediction data, the prediction rating, and a volume of received wager data associated with the anticipated outcome of the event, the wager opportunity being indicative of at least one of an optimal purchase or sales price and volume on the anticipated outcome of the event within a given wager pool, an arbitrage opportunity based on the event, or an aggregate outcome tiered volume control to control outsized exposure associated with the anticipated outcome of the event.

10. The system of claim 1, wherein the processor validates the outcome of the event when at least one of the classified confirmation data and the confirmation rating of the at least one confirmation data source is greater than the reduced threshold.

11. The system of claim 1, wherein the processor processes payment to the user based on the validated outcome of the event.

12. The system of claim 1, wherein the processor adjusts a prediction rating status of the at least one prediction data source by:
    determining whether the prediction rating is greater than a predetermined threshold,
    increasing the prediction rating status of the at least one prediction data source when the prediction rating is greater than the predetermined threshold, and
    decreasing the prediction rating status of the at least one prediction data source when the prediction rating is less than the predetermined threshold, wherein
    the prediction rating status is indicative of a status level within the system for prediction data.

13. The system of claim 1, wherein the processor adjusts a confirmation rating based on the classified confirmation data by:
    determining whether the received confirmation data is correct based on the validated outcome of the event,
    increasing the confirmation rating of the at least one confirmation data source when the confirmation data is validated, and
    decreasing the confirmation rating of the at least one confirmation data source when the confirmation data is not validated.

14. The system of claim 13, wherein the processor adjusts a confirmation rating status of the at least one confirmation data source by:
    determining whether the confirmation rating is greater than a predetermined threshold,
    increasing the confirmation rating status of the at least one confirmation data source when the confirmation rating is greater than the predetermined threshold, and
    decreasing the confirmation rating status of the at least one confirmation data source when the confirmation rating is less than the predetermined threshold, wherein
    the confirmation rating status is indicative of a status level within the system for confirmation data.

15. The system of claim 1, wherein the event is at least one of an athletic competition, a gaming competition, an online gaming competition, a regulated wagering competition or event, a performance competition, a vehicular competition, a political contest, an entertainment competition or show, a local competition, a national competition, an international competition, a recreational competition, a climate or weather forecast, a financial forecast, a virtual event, a metaverse event, a metaverse gaming contest, a currency valuation, a non-fungible token gaming experience, a non-fungible token gaming contest, a non-fungible token value, and a value of a rare object such as a trading card, a metal, a coin, and a gem.

16. The system of claim 1, wherein the at least one machine learning algorithm is one or more of a simple linear regression, a linear regression, a logistic regression, a binary regression, a polynomial regression, a support vector regression, a decision tree regression, ordinary least square regression, k-means, an ensemble method, an apiori algorithm, a principal component analysis, a singular value decomposition, reinforcement or semi-supervised machine learning, independent component analysis, supervised learning, unsupervised learning, a naive bayes, a bayesian statistical technique, a random forest, a neural network, a support vector machine, and a natural language processing technique.

17. The system of claim 1, wherein the at least one confirmation data source is one of a user, an administrator, an odds provider, a broadcasting network, a broadcaster, a journalist, a sponsor, a social media user, a third party data provider, scraped internet data, manually sourced data, and an industry expert.

18. The system of claim 1, wherein the at least one prediction data source is one of a user, an administrator, an odds provider, a broadcasting network, a broadcaster, a journalist, a sponsor, a social media user, a third party data provider, scraped internet data, manually sourced data, and an industry expert.

19. A method for event outcome validation, comprising the steps of:
receiving a user input indicative of an event and at least one anticipated outcome of the event to be wagered on by the user,
receiving confirmation data associated with at least one outcome of the event from at least one confirmation data source confirming the outcome of the event,
classifying the confirmation data utilizing at least one machine learning algorithm to determine an accuracy of the confirmation data,
determining a threshold of confirmation data sources to validate the outcome of the event,
utilizing the at least one machine learning algorithm to determine a reduced threshold of confirmation data sources to validate the outcome of the event based on at least one of the classified confirmation data and a confirmation rating of the at least one confirmation data source, the confirmation rating being indicative of a historical accuracy of confirmation data received from the at least one confirmation data source,
automatically validating the outcome of the event based on the reduced threshold,
receiving prediction data associated with the anticipated outcome of the event from at least one prediction data source,
classifying the prediction data utilizing the at least one machine learning algorithm in association with the anticipated outcome of the event to determine an accuracy of the prediction data, and
determining a prediction rating of the at least one prediction data source, the prediction rating being indicative of a historical accuracy of the prediction data received from the at least one prediction data source,
adjusting the prediction rating of the at least one prediction data source based on the classified prediction data by:
determining whether the received prediction data is correct based on the validated outcome of the event,
increasing the prediction rating of the at least one prediction data source when the prediction data is validated, and
decreasing the prediction rating of the at least one prediction data source when the user prediction data is not validated.

20. The method of claim 19, further comprising the steps of determining, based on the user input, whether the event is available to be wagered on by the user, generating the event, based on the user input, when the event is unavailable to be wagered on by the user, updating the event, based on the user input, when the event is available to be wagered on by the user, and selecting the generated or updated event.

21. The method of claim 19, wherein the step of classifying the confirmation data utilizing the at least one machine learning algorithm to determine the accuracy of the confirmation data further comprises the steps of:
filtering the confirmation data into event types,
categorizing the filtered confirmation data based on a plurality of variables,
ranking the categorized confirmation data, and
storing the ranked confirmation data.

22. The method of claim 19, further comprising the steps of:
determining a population size associated with the outcome of the event,
determining the threshold of confirmation data sources to validate the outcome of the event based on the population size and a first plurality of variables, and
utilizing the at least one machine learning algorithm to determine the reduced threshold of confirmation data sources to validate the outcome of the event by scaling for the population size and a second plurality of variables based on at least one of the classified confirmation data and the confirmation rating.

23. The method of claim 19, wherein the step of classifying the prediction data utilizing the at least one machine learning algorithm in association with the anticipated outcome of the event to determine the accuracy of the prediction data further comprises the steps of:
filtering the prediction data into event types,
categorizing the filtered prediction data based on a plurality of variables,
ranking the categorized prediction data, and
storing the ranked prediction data.

24. The method of claim 19, further comprising the step of determining and displaying odds associated with the anticipated outcome of the event by:
receiving a user input indicative of wager data for the anticipated outcome of the event,
determining whether a received volume of wager data for the event is greater than a first predetermined threshold, and
displaying real odds associated with the anticipated outcome of the event when the received volume of wager data for the event is greater than the first predetermined threshold.

25. The method of claim 19, further comprising the step of determining and displaying predicted odds associated with the anticipated outcome of the event by:
determining whether at least one of the classified prediction data and the prediction rating of the at least one prediction data source is greater than a predetermined threshold, and
displaying the predicted odds associated with the anticipated outcome of the event when at least one of the classified prediction data and the prediction rating of the at least one prediction data source is greater than the predetermined threshold, wherein
the predicted odds are indicative of data sourced internally within the system.

26. The method of claim 19, wherein the processor determines and displays projected odds associated with an anticipated outcome of the event by determining whether at least one of the classified prediction data and the prediction rating of the at least one prediction data source is greater than a predetermined threshold, and displaying the projected odds associated with the anticipated outcome of the event when at least one of the classified prediction data and the prediction rating of the at least one prediction data source is greater than the predetermined threshold, wherein the projected odds are indicative of data initially sourced externally to the system.

27. The method of claim 19, further comprising the step of identifying and displaying at least one of a wager buying opportunity and a wager selling opportunity by utilizing the classified prediction data, the prediction rating, and a volume of received wager data associated with the anticipated outcome of the event, the wager opportunity being indicative of at least one of an optimal purchase or sales price and volume on the anticipated outcome of the event within a given wager pool, an arbitrage opportunity based on the event, or an aggregate outcome tiered volume control to control outsized exposure associated with the anticipated outcome of the event.

28. The method of claim 19, further comprising the step of validating the outcome of the event when at least one of the classified confirmation data and the confirmation rating of the at least one confirmation data source is greater than the reduced threshold.

29. The method of claim 19, further comprising the step of processing payment to the user based on the validated outcome of the event.

30. The method of claim 19, further comprising the step of adjusting a prediction rating status of the at least one prediction data source by:
determining whether the prediction rating is greater than a predetermined threshold,
increasing the prediction rating status of the at least one prediction data source when the prediction rating is greater than the predetermined threshold, and
decreasing the prediction rating status of the at least one prediction data source when the prediction rating is less than the predetermined threshold, wherein
the prediction rating status is indicative of a status level within the system for prediction data.

31. The method of claim 19, further comprising the step of adjusting a confirmation rating based on the classified confirmation data by:
determining whether the received confirmation data is correct based on the validated outcome of the event,
increasing the confirmation rating of the at least one confirmation data source when the confirmation data is validated, and
decreasing the confirmation rating of the at least one confirmation data source when the confirmation data is not validated.

32. The method of claim 31, further comprising the step of adjusting a confirmation rating status of the at least one confirmation data source by:
determining whether the confirmation rating is greater than a predetermined threshold,
increasing the confirmation rating status of the at least one confirmation data source when the confirmation rating is greater than the predetermined threshold, and
decreasing the confirmation rating status of the at least one confirmation data source when the confirmation rating is less than the predetermined threshold, wherein
the confirmation rating status is indicative of a status level within the system for confirmation data.

33. The method of claim 19, wherein the event is at least one of an athletic competition, a gaming competition, an online gaming competition, a regulated wagering competition or event, a performance competition, a vehicular competition, a political contest, an entertainment competition or show, a local competition, a national competition, an international competition, a recreational competition, a climate or weather forecast, a financial forecast, a virtual event, a metaverse event, a metaverse gaming contest, a currency valuation, a non-fungible token gaming experience, a non-fungible token gaming contest, a non-fungible token value, and a value of a rare object such as a trading card, a metal, a coin, and a gem.

34. The method of claim 19, wherein the at least one machine learning algorithm is one or more of a simple linear regression, a linear regression, a logistic regression, a binary regression, a polynomial regression, a support vector regression, a decision tree regression, ordinary least square regression, k-means, an ensemble method, an apiori algorithm, a principal component analysis, a singular value decomposition, reinforcement or semi-supervised machine learning, independent component analysis, supervised learning, unsupervised learning, a naive bayes, a random forest, a neural network, a support vector machine, and a natural language processing technique.

35. The method of claim 19, wherein the at least one confirmation data source is one of a user, an administrator, an odds provider, a broadcasting network, a broadcaster, a journalist, a sponsor, a social media user, a third party data provider, scraped internet data, manually sourced data, and an industry expert.

36. The method of claim 19, wherein the at least one prediction data source is one of a user, an administrator, an odds provider, a broadcasting network, a broadcaster, a journalist, a sponsor, a social media user, a third party data provider, scraped internet data, manually sourced data, and an industry expert.

37. A non-transitory, computer-readable medium having computer readable instructions stored thereon for event outcome validation which, when executed by a processor, causes the processor to carry out the steps of:
receiving a user input indicative of an event and at least one anticipated outcome of the event to be wagered on by the user,
receiving confirmation data associated with at least one outcome of the event from at least one confirmation data source confirming the outcome of the event,
classifying the confirmation data utilizing at least one machine learning algorithm to determine an accuracy of the confirmation data, determining a threshold of confirmation data sources to validate the outcome of the event, utilizing the at least one machine learning algorithm to determine a reduced threshold of confirmation data sources to validate the outcome of the event based on at least one of the classified confirmation data and a confirmation rating of the at least one confirmation data source, the confirmation rating being indicative of a historical accuracy of confirmation data received from the at least one confirmation data source, automatically validating the outcome of the event based on the reduced threshold, receiving prediction data associated with the anticipated outcome of the event from at least one prediction data source, classifying the prediction data utilizing the at least one machine learning algorithm in association with the anticipated outcome of the event to determine an accuracy of the prediction data, and determining a prediction rating of the at least one prediction data source, the prediction rating being indicative of a historical accuracy of the prediction data received from the at least one prediction data source, adjusting the prediction rating of the at least one prediction data source based on the classified prediction data by:

determining whether the received prediction data is correct based on the validated outcome of the event, increasing the prediction rating of the at least one prediction data source when the prediction data is validated, and decreasing the prediction rating of the at least one prediction data source when the user prediction data is not validated.

* * * * *